(12) United States Patent
Yaremenko et al.

(10) Patent No.: US 11,720,144 B2
(45) Date of Patent: Aug. 8, 2023

(54) HINGED DEVICE

(71) Applicant: Microsoft Technology Licensing, LLC, Redmond, WA (US)

(72) Inventors: Denys V. Yaremenko, Carnation, WA (US); Daniel C. Park, Woodinville, WA (US); Errol Mark Tazbaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/537,376

(22) Filed: Nov. 29, 2021

(65) Prior Publication Data

US 2023/0168713 A1 Jun. 1, 2023

(51) Int. Cl.
*G06F 1/16* (2006.01)
*F16C 11/04* (2006.01)

(52) U.S. Cl.
CPC ............ *G06F 1/1616* (2013.01); *F16C 11/04* (2013.01); *G06F 1/1681* (2013.01)

(58) Field of Classification Search
None
See application file for complete search history.

(56) References Cited

U.S. PATENT DOCUMENTS

| | | | |
|---|---|---|---|
| 10,545,541 B1 * | 1/2020 | Dighde | F16M 11/06 |
| 10,754,377 B2 * | 8/2020 | Siddiqui | H04M 1/0216 |
| 2002/0073508 A1 | 6/2002 | Rude | |
| 2005/0160557 A1 | 7/2005 | Oshima et al. | |
| 2006/0272128 A1 | 12/2006 | Rude et al. | |
| 2012/0204380 A1 | 8/2012 | Chen | |
| 2014/0007379 A1 | 1/2014 | Yang | |
| 2014/0059805 A1 | 3/2014 | Krahn et al. | |
| 2018/0363341 A1 * | 12/2018 | Siddiqui | E05D 3/122 |
| 2019/0094917 A1 * | 3/2019 | Schmelzle | E05F 1/1253 |
| 2020/0249723 A1 | 8/2020 | Mizoguchi et al. | |
| 2021/0325937 A1 * | 10/2021 | Siddiqui | G06F 1/1679 |

FOREIGN PATENT DOCUMENTS

| | | |
|---|---|---|
| CN | 106686938 A | 5/2017 |
| JP | H08121009 A | 5/1996 |
| JP | 2011220379 A | 11/2011 |

OTHER PUBLICATIONS

"International Search Report and Written Opinion Issued in PCT Application No. PCT/US22/042840", dated Jan. 9, 2023, 13 Pages.

* cited by examiner

*Primary Examiner* — Anthony Q Edwards
*Assistant Examiner* — Rashen E Morrison
(74) *Attorney, Agent, or Firm* — Rainier Patents, P.S.

(57) ABSTRACT

The description relates to hinged devices, such as hinged computing devices. One example can include a first portion and a second portion that are rotatably secured relative to a hinge axis through a range of rotation from a closed orientation to an open orientation. The example can also include an oblong friction shaft and a friction band secured to the first portion and defining an oblong aperture configured to receive the oblong friction shaft. At the closed orientation a major axis of the oblong friction shaft is aligned with a major axis of the oblong aperture to provide a relatively low resistance to rotation and at the open orientation the major axis of the oblong friction shaft is rotated relative to the major axis of the oblong aperture to provide a relatively high resistance to rotation.

20 Claims, 23 Drawing Sheets

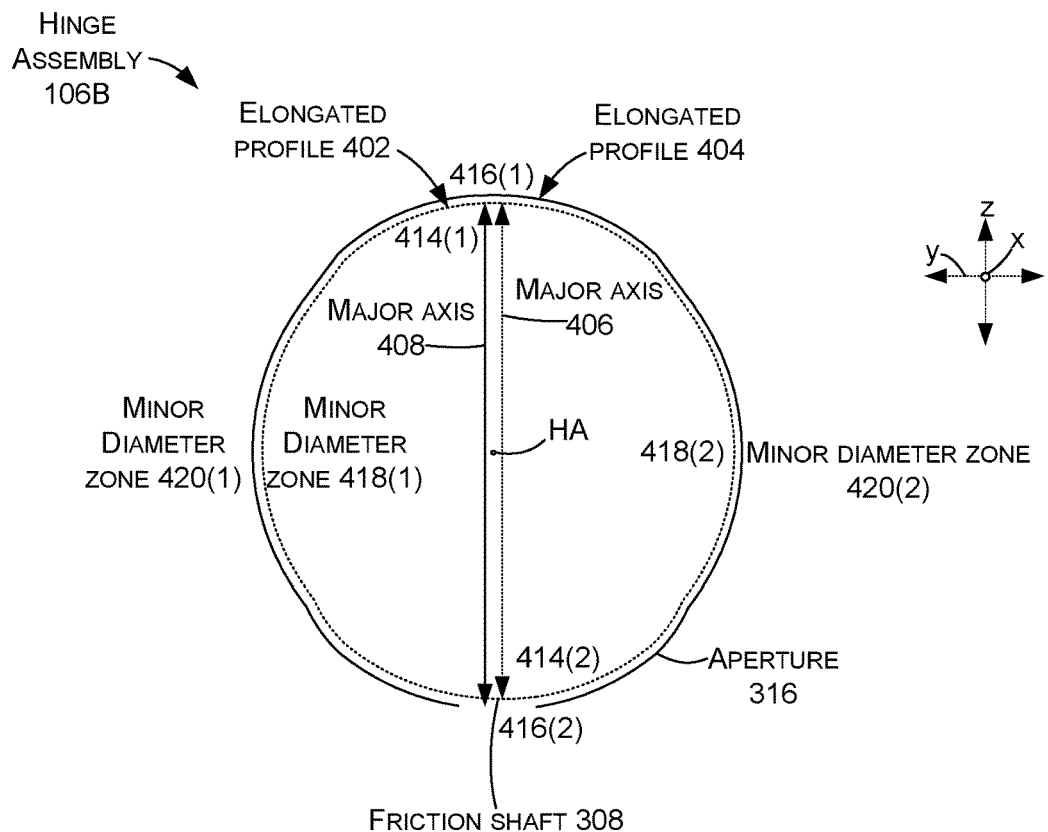
FIG. 5A   ZERO-DEGREE ORIENTATION
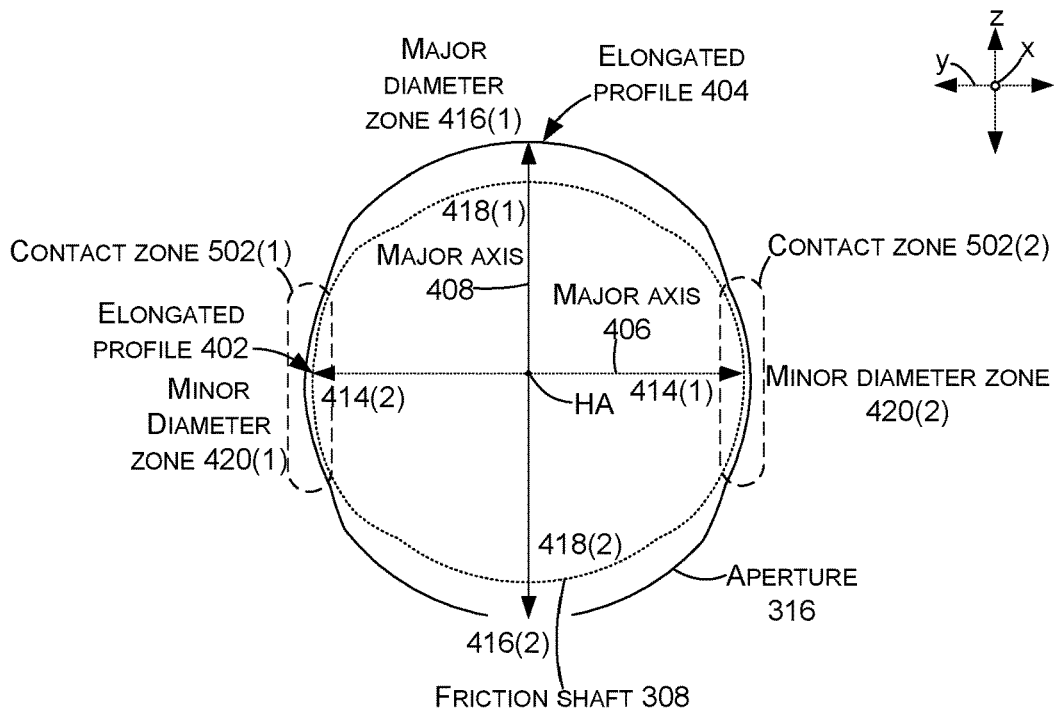
FIG. 5B   180-DEGREE ORIENTATION

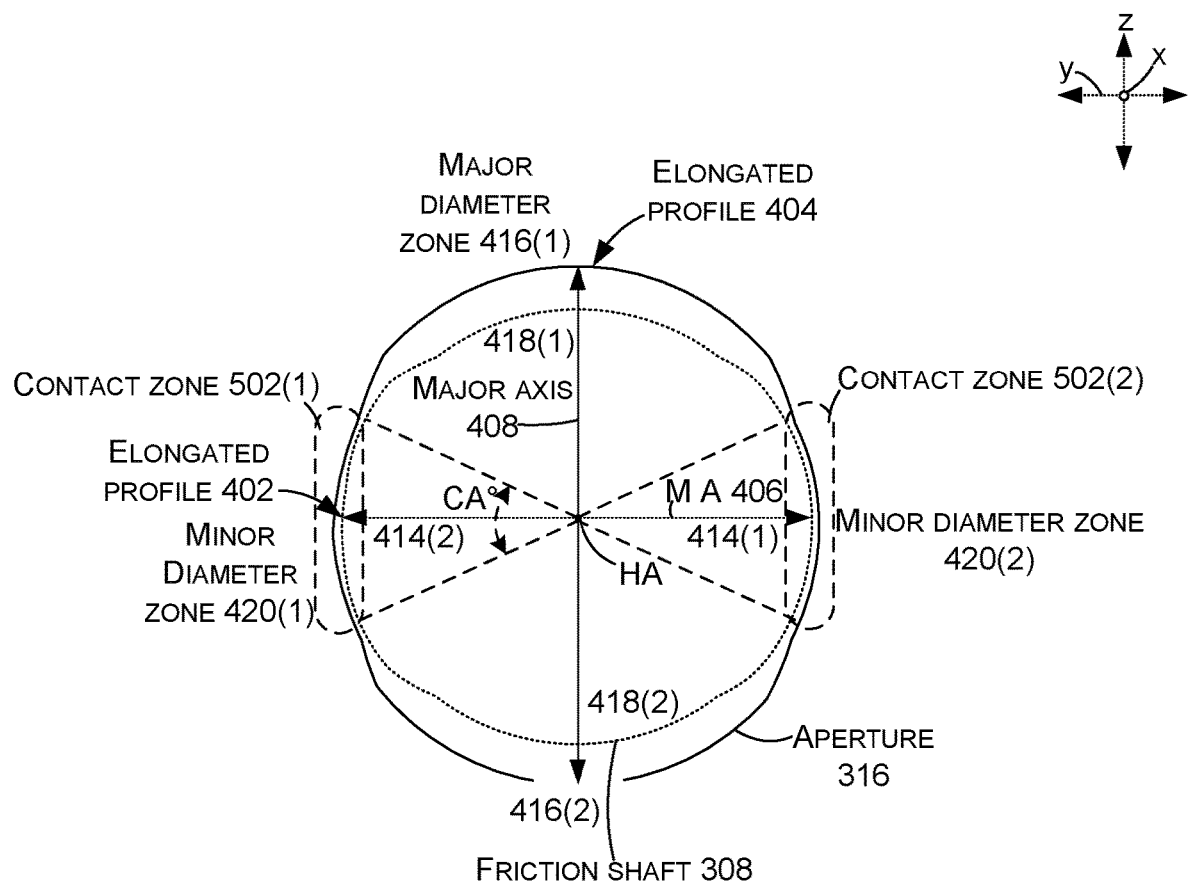
FIG. 5C    180-DEGREE ORIENTATION

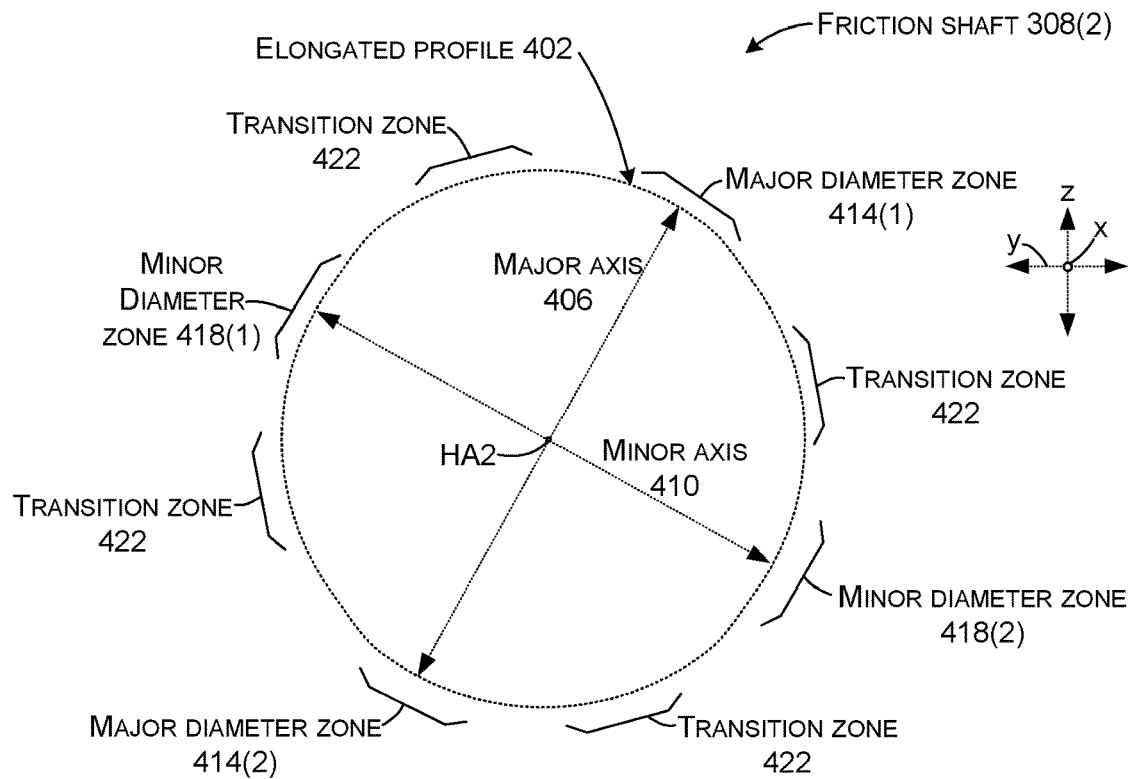
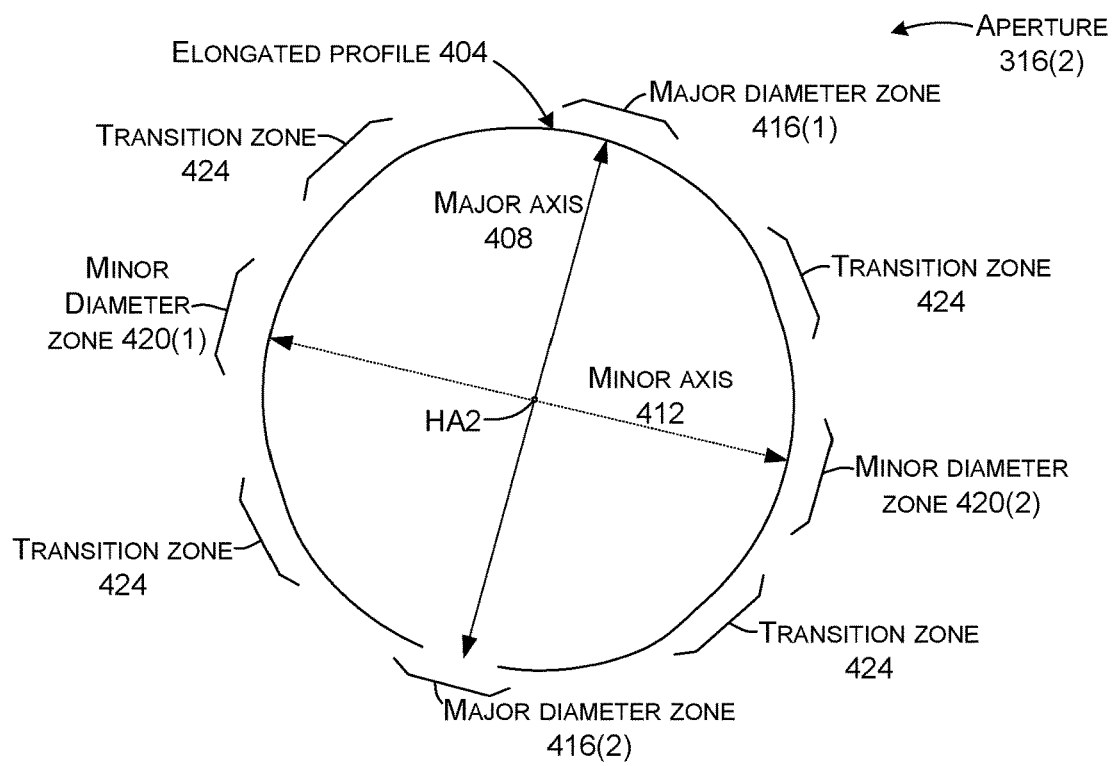
FIG. 6E

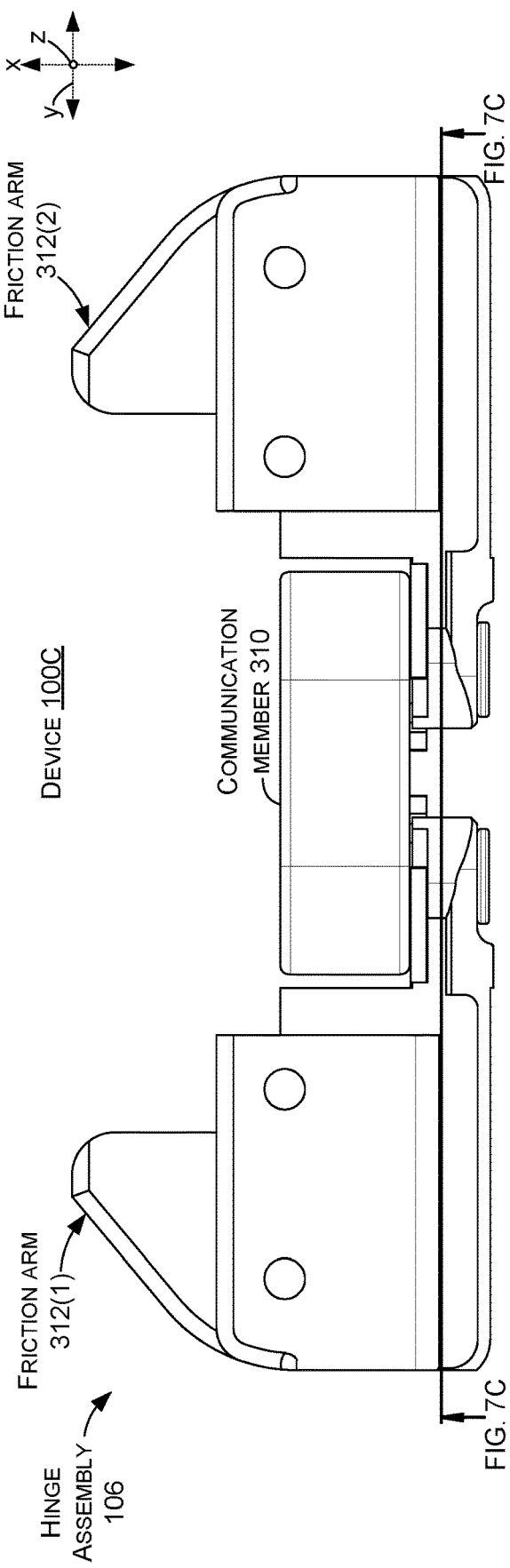
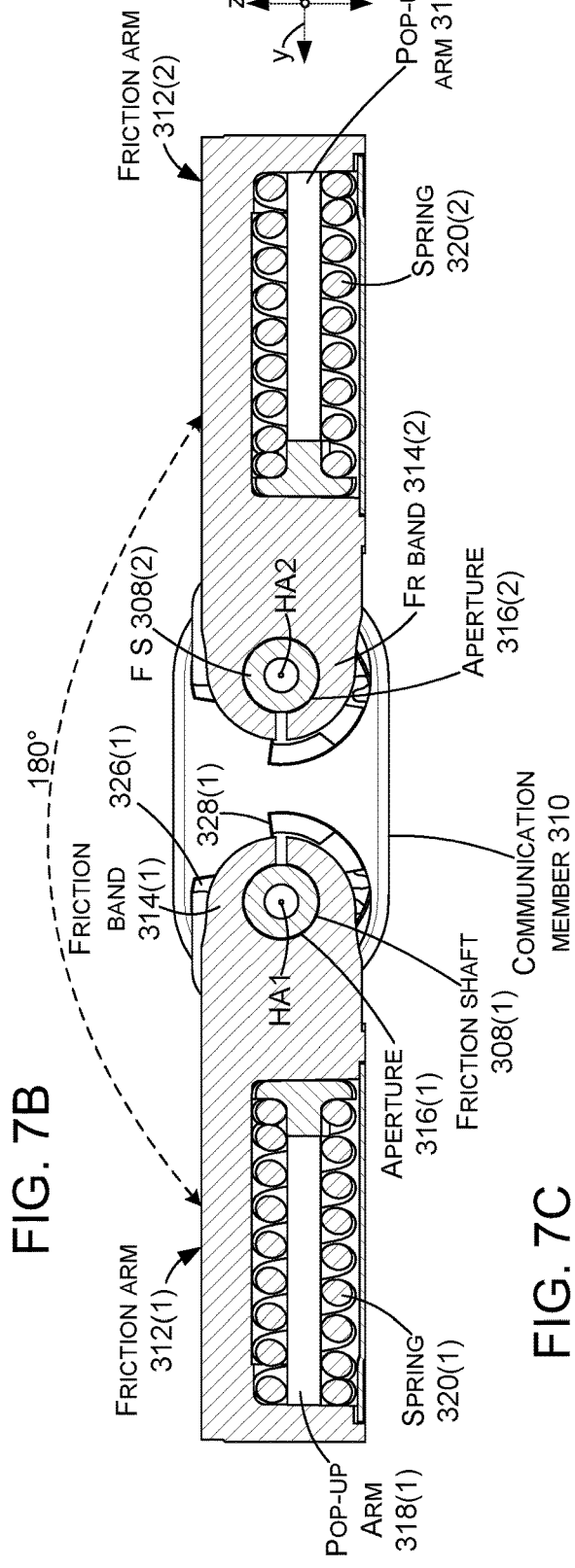

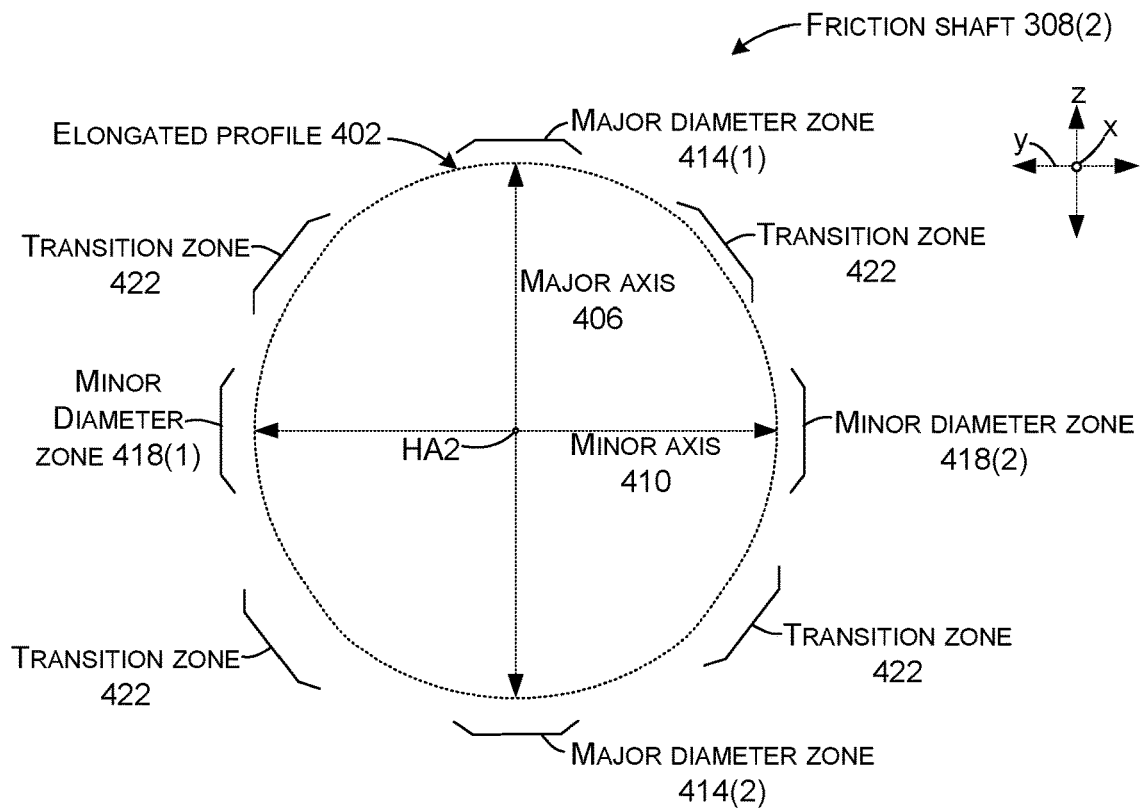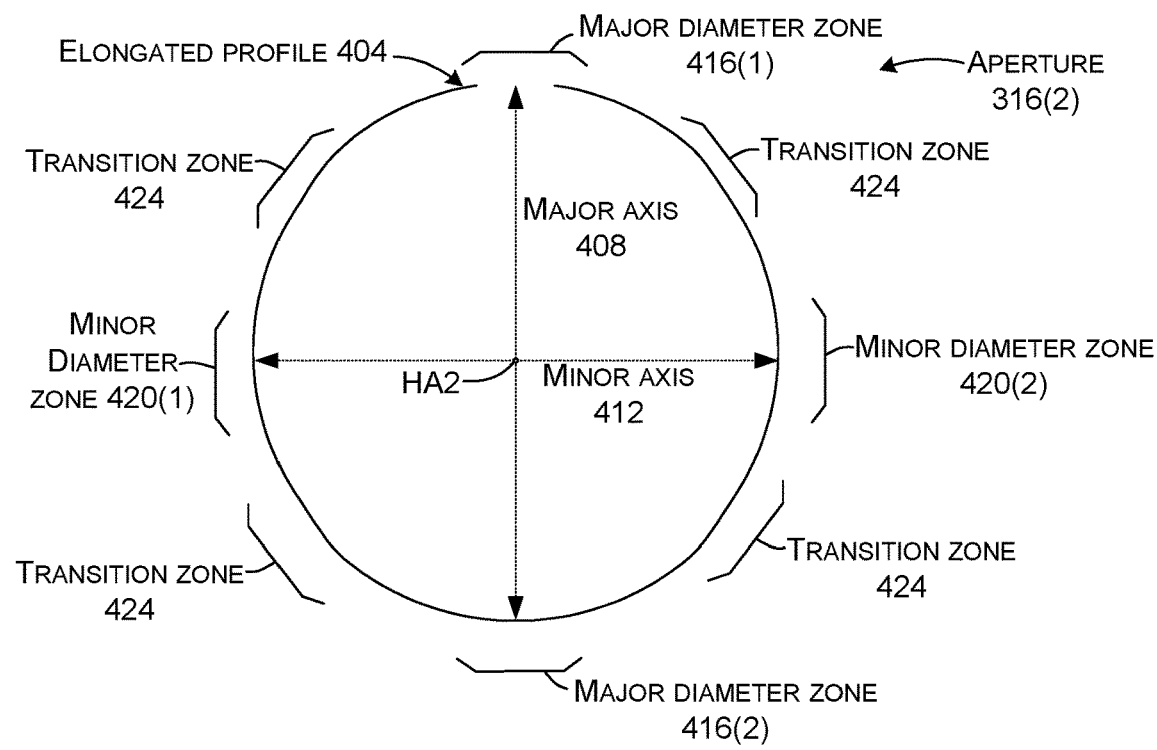
FIG. 8E

HINGED DEVICE

BACKGROUND

Many computer form factors such as smart phones, tablets, and notebook computers can provide enhanced functionality by folding for storage and opening for use. For instance, the folded device is easier to carry and the opened device offers more input/output area. Many hinged designs have been tried.

SUMMARY

This patent relates to hinged devices, such as hinged computing devices. One example can include a first portion and a second portion that are rotatably secured relative to a hinge axis through a range of rotation from a closed orientation to an open orientation. The example can also include an oblong friction shaft and a friction band secured to the first portion and defining an oblong aperture configured to receive the oblong friction shaft, which extends coincident with the hinge axis. At the closed orientation a major axis of the oblong friction shaft is aligned parallel with a major axis of the oblong aperture to provide a relatively low resistance to rotation and at the open orientation the major axis of the oblong friction shaft is rotated non-parallel relative to the major axis of the oblong aperture to provide a relatively high resistance to rotation.

This example is intended to provide a summary of some of the described concepts and is not intended to be inclusive or limiting.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced. Where space permits, elements and their associated reference numbers are both shown on the drawing page for the reader's convenience. Otherwise, only the reference numbers are shown. Note that some figures illustrate many elements and adding lead lines to all of the elements can diminish readability of the figure. Accordingly, not every element is designated in every figure. In some figures, where similar elements appear twice on the figure, such as on the left side and the right side, some elements are labeled on one side, but not both sides to avoid clutter on the drawing page.

FIGS. 4B, 6B, 7B, and 8B show elevational views of example devices in accordance with some implementations of the present concepts.

FIGS. 4C-4E, 5A-5C, 6C-6E, 7C-7E, and 8C-8E show sectional views of example devices in accordance with some implementations of the present concepts.

DESCRIPTION

The present concepts relate to devices, such as computing devices employing hinge assemblies that can rotationally secure/couple first and second device portions. The hinge assemblies can provide friction (e.g., resistance to rotation) so that the device can maintain a specific orientation, such as a 100-130-degree orientation that users tend to set their notebook computers. However, users may want less (or no) resistance to rotation at other orientations, such as at a closed orientation so that the user can easily open the device with one hand. Providing different friction levels at different orientations becomes even more challenging when the amount of device real estate available for the hinge assembly is limited. This problem is compounded as devices become thinner and thus hinge assembly components in turn are thinner.

Hinges that are durable while occupying minimal device real estate (in the x, y, and/or z reference directions) have been difficult to achieve. The shortcomings of existing solutions have been magnified as devices have been made ever thinner and less room is available for hinges, such as due to smaller bezels. These thinner and smaller components tend to be less reliable and more subject to wear related issues during a functional lifetime of the device.

The present concepts relate to hinge assemblies that provide desired friction profiles. The hinge assemblies can achieve the friction with interactions between a friction band and friction shaft. The present concepts can provide a very thin and short friction band and friction shaft that provide desired friction at specific orientations, satisfy device real estate constraints, and are very wear resistant.

Figure 1:
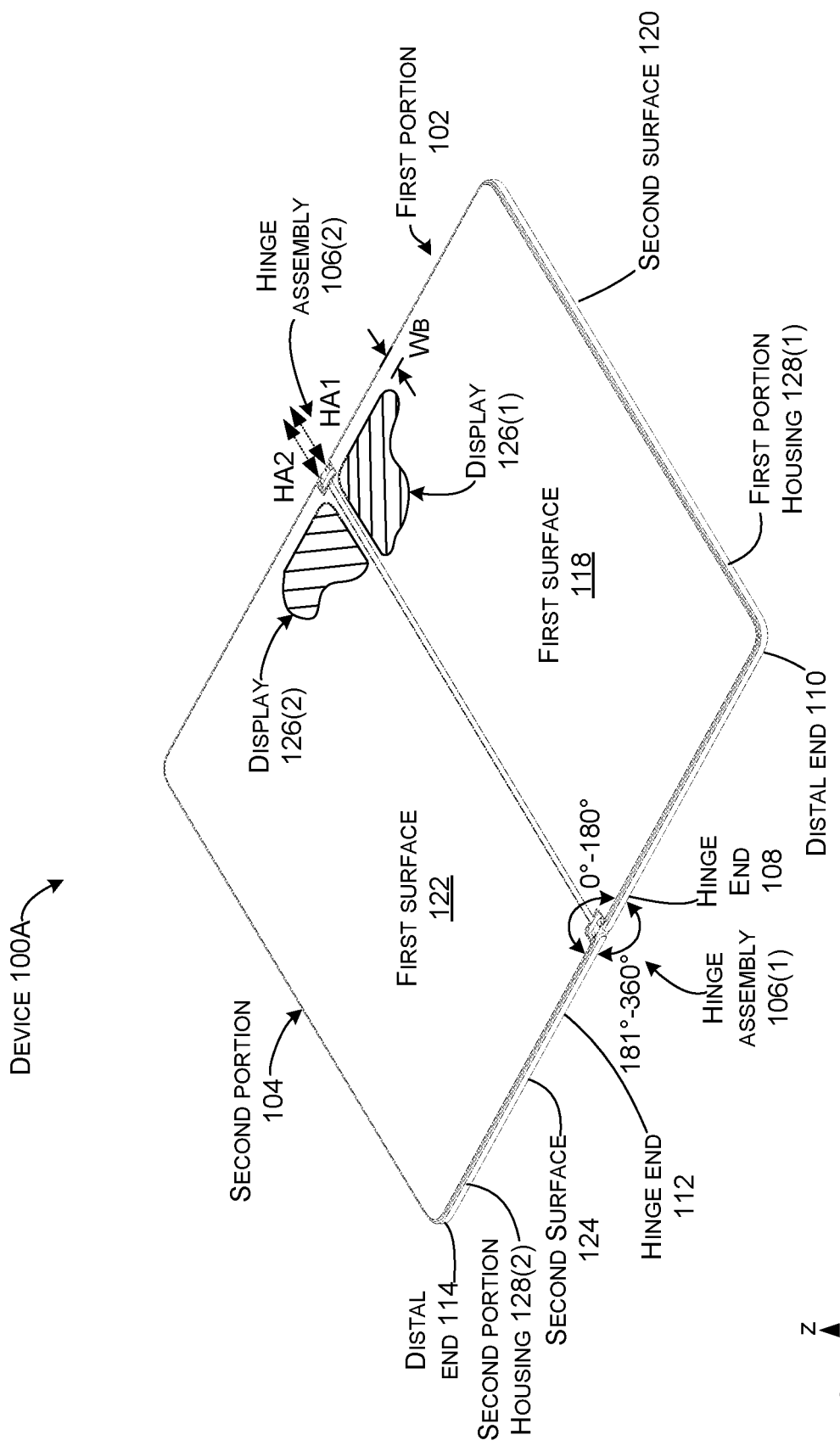
FIGS. 1, 2A-2E, 4A, 6A, 7A, and 8A show perspective views of example devices in accordance with some implementations of the present concepts.

Introductory FIG. 1 shows an example device 100A that has first and second portions 102 and 104 that are rotatably secured together by hinge assemblies 106. (The use of a suffix e.g., 'A' with the designator 100 is intended to indicate that elements of the various described devices may be the same or different). The hinge assemblies can rotatably secure the first and second portions through a range of rotations. In the illustrated implementation, two hinge assemblies 106(1) and 106(2) are employed at opposing ends of the device, but other implementations could employ different numbers of hinge assemblies and/or locations for the hinge assemblies.

The first portion 102 can extend from a hinge end 108 to a distal end 110. The second portion 104 also can extend from a hinge end 112 to a distal end 114. In this implementation, the hinge assemblies 106 can define two hinge axes HA. The first portion 102 can rotate around first hinge axis HA1 and the second portion 104 can rotate around second hinge axis HA2. Other implementations can define a single hinge axis or more than two hinge axes.

The first portion 102 can include opposing first and second major surfaces 118 and 120 (hereinafter, first and second surfaces). Similarly, the second portion 104 can include opposing first and second major surfaces 122 and 124 (hereinafter, first and second surfaces). (Note the second surfaces 120 and 124 are facing away from the viewer and as such are not directly visible in this view, but are shown and designated in subsequent FIGS.).

In some implementations, displays 126 are supported by housing 128. For example, the displays 126 can be positioned on the first and/or second surfaces 118, 120, 122, and/or 124, respectively. In the illustrated configuration, the displays 126 are positioned on first surfaces 118 and 122, respectively. Note that the configuration of the hinge assemblies 106 can affect the extent to which the displays 126 can cover the surfaces, such as first surfaces 118 and 122. For instance, the configuration of the hinge assemblies 106 can affect a bezel width WB where the displays do not cover the surfaces (e.g., from the edge of the display to the edge of the device). This aspect will be discussed below.

In this example, the range of rotations extends from a closed orientation (e.g., zero-degree orientation) with the first surfaces 118 and 122 closed against one another, through various open orientations, such as the 180-degree orientation illustrated in FIG. 1, to another closed orientation (e.g., 360-degree orientation) with the second surfaces 120 and 124 closed against one another. Other implementations may have other ranges of rotation. For instance, the range of rotation could be 0 degrees to 90 degrees or 0 degrees to 180 degrees, for example.

Figure 2A:
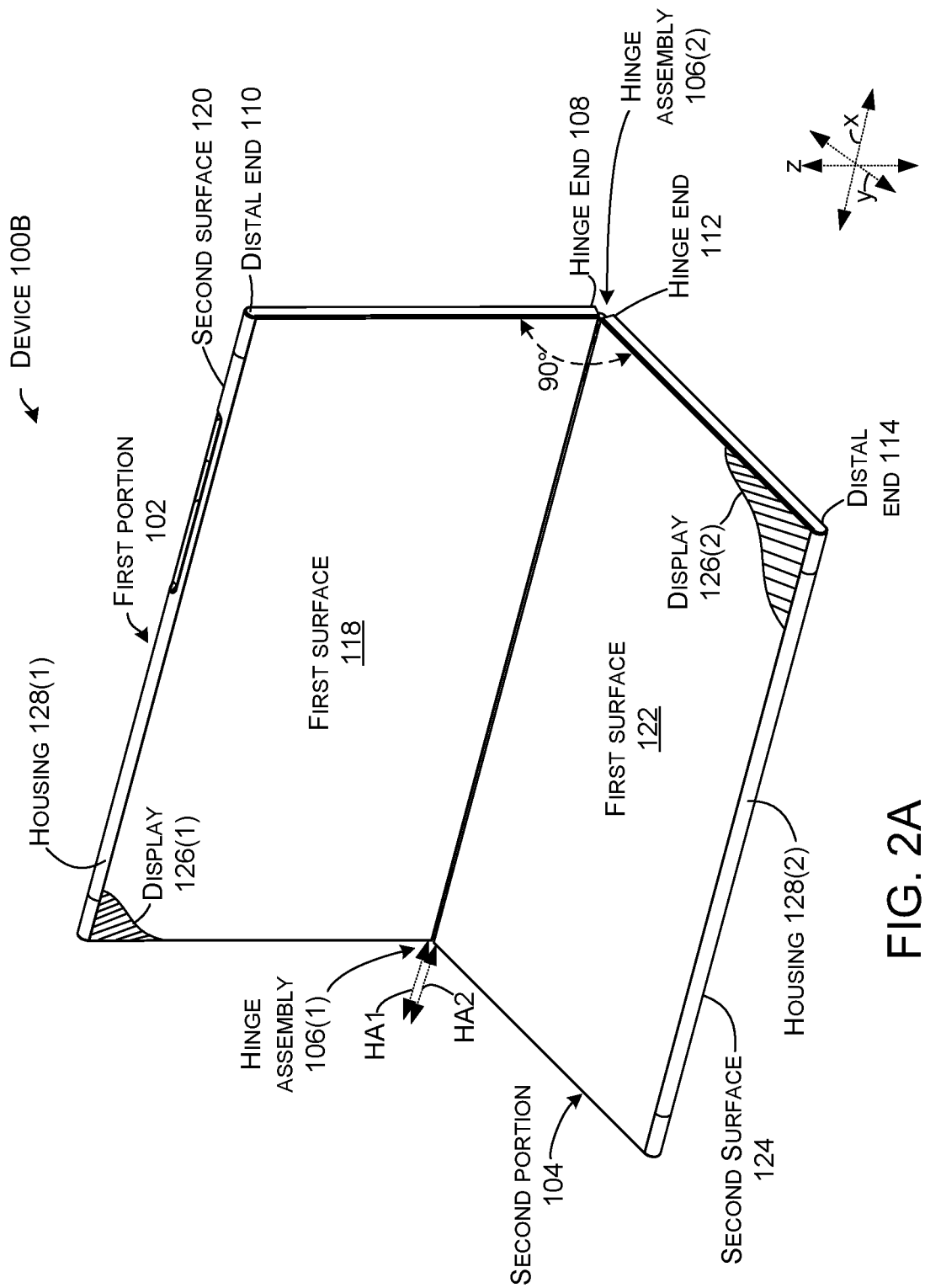
Figure 2B:
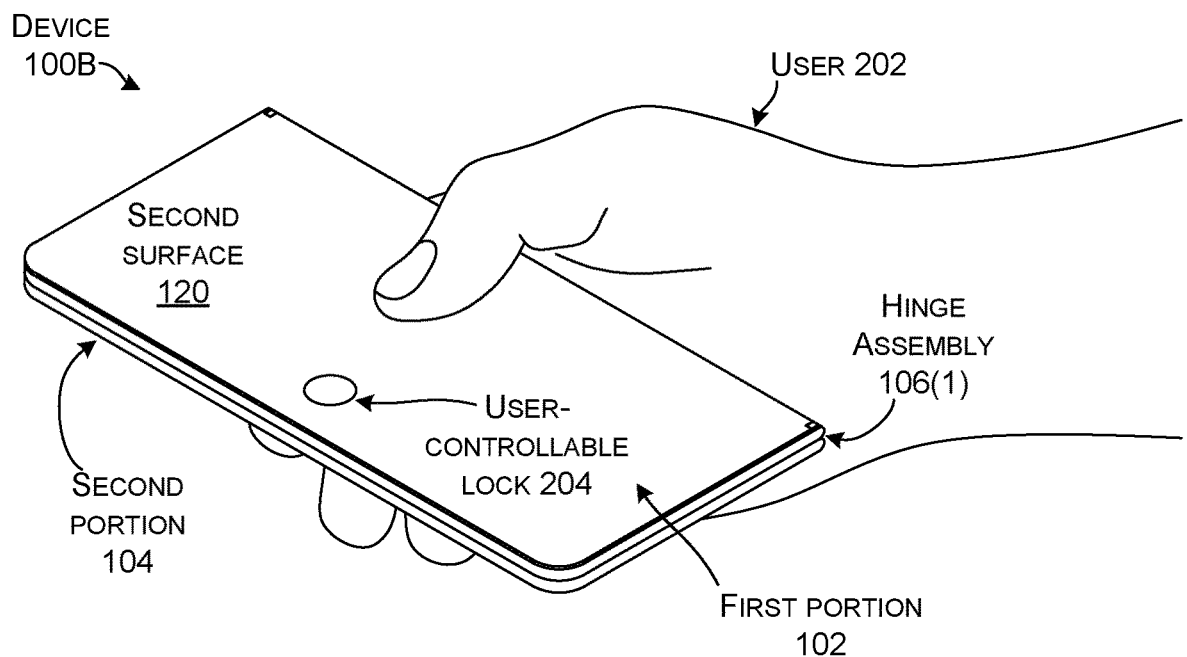

FIGS. 2A-2E collectively show another device 100B and features provided by this device. FIG. 2A shows device 100B in an open orientation of about 90 degrees where the user can see and/or engage displays 126. The hinge assemblies 106 can provide resistance to rotation to maintain the first and second portions in this orientation. FIG. 2B shows the device 100B in the closed orientation where the first and second portions 102 and 104 are positioned parallel to and against one another. The closed orientation can be very compact and easy for the user 202 to transport. For instance, the device may fit in the user's pocket. Further, the first surfaces can be protected in this closed orientation by the second surfaces (e.g., by the housing).

In this implementation, device 100B can also feature a user-controllable lock 204. The user-controllable lock 204 can function to maintain the first and second portions 102 and 104 in the closed orientation unless released by the user 202. In this example, the hinge assemblies 106 also include a pop-up feature that biases the first and second portions 102 and 104 away from each other from the closed orientation when the lock is released. At the closed orientation, the hinge assembly can produce less resistance to rotation than at the open orientation of FIG. 2A. The resistance to rotation can counter the pop-up force and reduce the effectiveness of the pop-up feature and thus an orientation specific reduction in resistance to rotation allows the pop-up feature to function as intended. The pop-up feature is described in more detail below. Briefly, the pop-up feature can provide a technical benefit of allowing a user to open a device with a single hand, where otherwise both hands would likely be required.

Figure 2C:
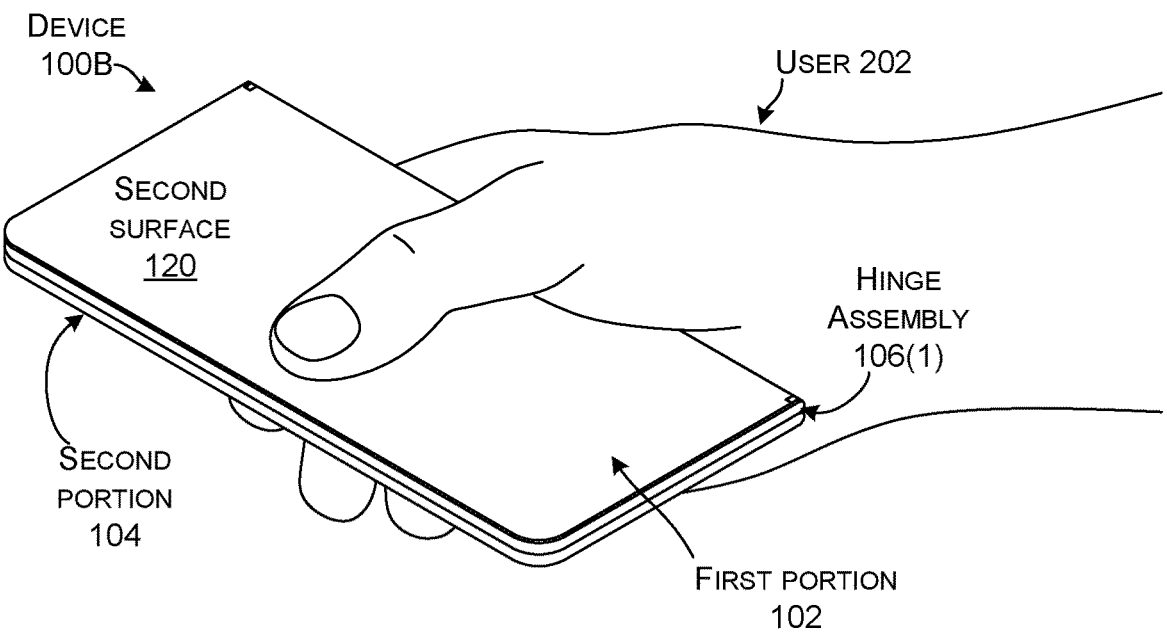

Assume that as shown in FIGS. 2B and 2C the user 202 wants to open the device 100B. For instance, the user may want to return to an open orientation, such as shown in FIG. 2A. As shown in FIGS. 2B and 2C, to open the device 100B the user 202 can simply engage the user-controllable lock 204. In this implementation, the user can engage the user-controllable lock with a single digit (in the illustration his/her thumb) to activate the user-controllable lock and release the first and second portions 102 and 104.

Figure 2D:
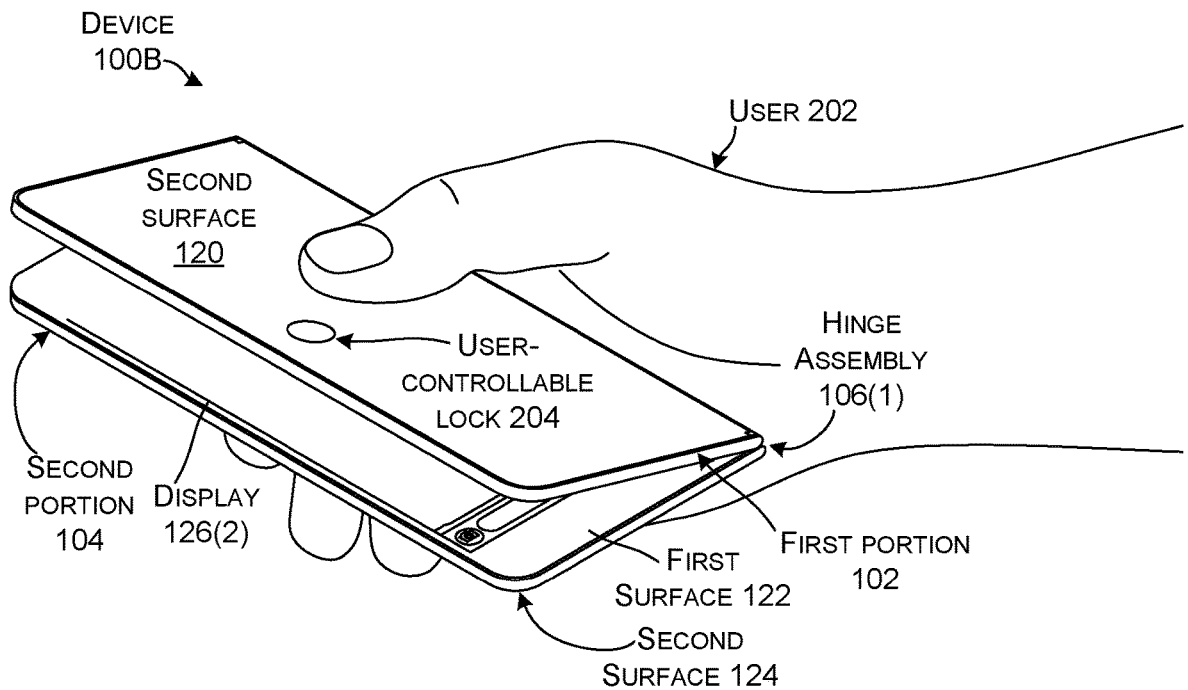

As shown in FIG. 2D, responsive to the user 202 releasing the user-controllable lock 204, the device 100B can automatically open the first and second portions 102 and 104 a few degrees without further user effort. In this case, the hinge assemblies 106 provide a force that biases the first and second portions apart from the closed orientation unless the user-controllable lock 204 maintains the closed orientation. This bias can be viewed as a 'pop-up' feature. Further, once the device 100B is popped-up or popped-open, the device can maintain the orientation without user intervention (e.g., the user doesn't have to hold the device open) due to resistance to rotation in the hinge assemblies 106. The present concepts can offer hinge assemblies that provide a resistance to rotation that varies with the orientation of the device. For instance, the resistance to rotation can be lower at the closed orientation and get progressively higher as the angle increases until an upper level of resistance to rotation is reached. This allows the pop-up force to be the dominant force when the device is closed and the resistance to rotation (e.g., friction) to be the dominant force once the device opens or is opened so that the device maintains the orientation the user sets it at.

Figure 2E:
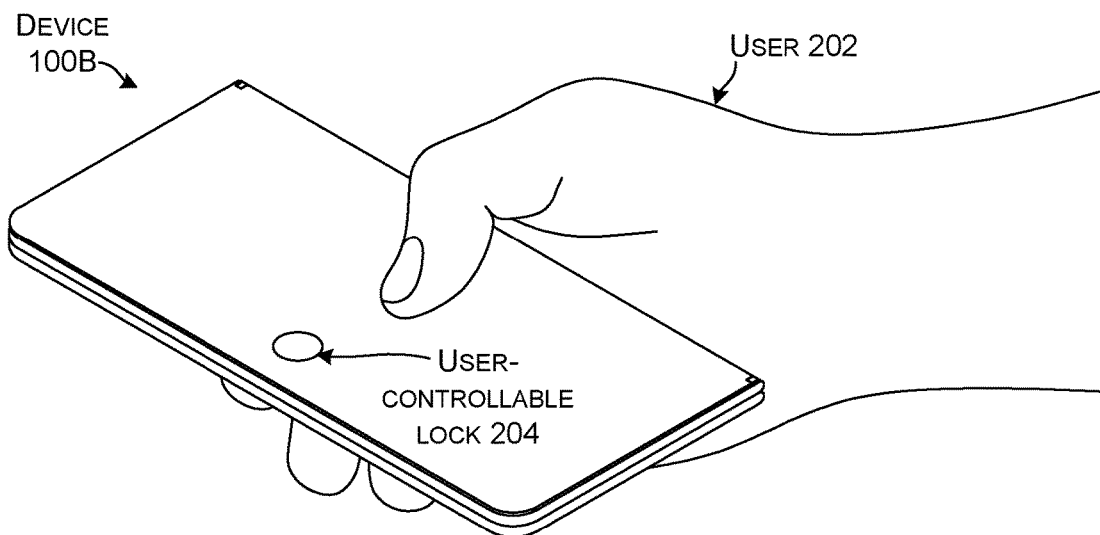

The pop-up feature can allow the user 202 to easily manually open the portions 102 and 104 further if desired, such as to view the displays 126. When the user is done, he/she can close the device 100B simply by pressing down with his/her thumb until the device is closed, and the user-controllable lock 204 can re-engage as shown in FIG. 2E.

Note that the illustrated implementation employs the user-controllable lock 204 on the second surface 120, but other locations are contemplated.

FIGS. 3-8E collectively illustrate several aspects of the present concepts.

Figure 3:
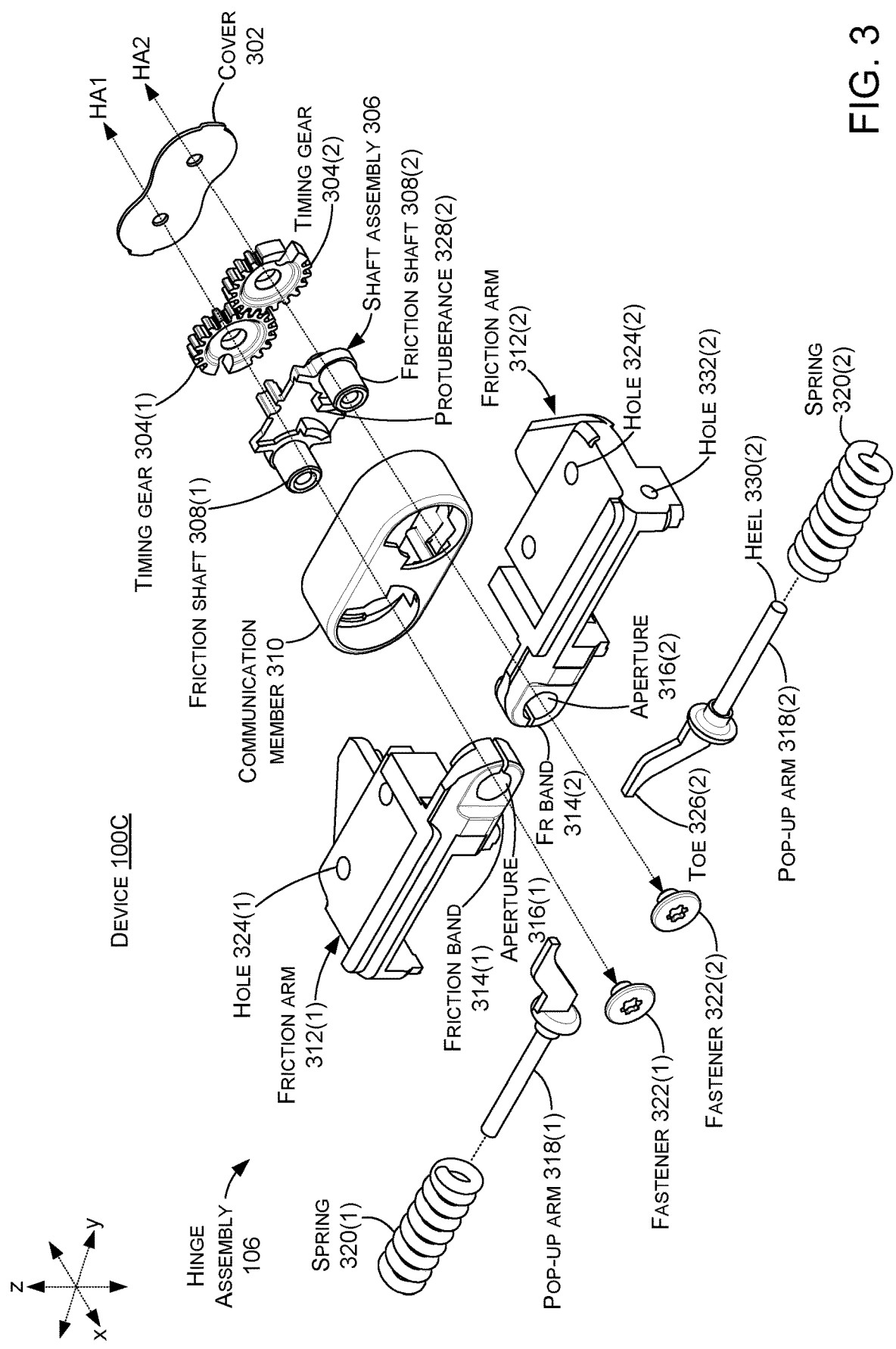
FIG. 3 shows an exploded perspective view of an example device in accordance with some implementations of the present concepts.

FIG. 3 shows details of example hinge assembly 106 of device 100C that can rotationally couple the first and second portions. In this case, the hinge assembly 106 includes a cover 302, timing gears 304, shaft assembly 306 that defines oblong friction shafts 308, communication member 310, friction arms 312 that include friction bands 314 that define oblong apertures 316, pop-up arms 318, springs 320, and fasteners 322. The friction arms 312(1) and 312(2) can be fastened to the first and second portions 102 and 104, respectively via fasteners (not shown) that extend through the first and second portions and are received in holes 324.

The shaft assembly 306 and the timing gears 304 can be assembled into the communication member 310 and retained by the cover. The timing gears 304 can be intermeshed to synchronize rotation (e.g., extent of rotation) of the first and second portions 102 and 104 around the first and second hinge axes HA1 and HA2. For instance, the timing gears 304 can ensure that 20 degrees of rotation of the first portion 102 around the first hinge axis HA1 simultaneously produces 20 degrees of rotation of the second portion 104 around the second hinge axis HA2. Thus, the timing gears function as a timing element to synchronize rotation around the hinge shafts to provide a technical solution of maintaining the hinge assembly in a neutral position between the first and second portions so that they do not unintentionally bump into one another during rotation. Other timing elements are contemplated.

The oblong friction shafts 308 can extend through the communication member 310 and into the oblong apertures 316 of the friction bands 314. The oblong friction shafts 308 can be retained in the apertures 316 by fasteners 322. The oblong friction shafts 308 can be oblong shaped when viewed orthogonally to the hinge axis. Similarly, the oblong apertures 316 can be oblong shaped when viewed orthogonally to the hinge axis. For sake of brevity, the oblong friction shafts 308 may be referred to as 'friction shafts.' Similarly, the oblong apertures 316 may be referred to as 'apertures.'

The springs 320 can be assembled onto the pop-up arms 318. This assemblage can be positioned in, and retained by the friction arms 312. Toes 326 of the pop-up arms can extend through the friction arms and contact protuberances 328 on the shaft assembly 306 at specific orientations, such as zero to ten degrees for instance. Heels 330 (e.g., opposite end from the toes) can be retained by holes 332 in the friction arms 312. (The toes 326, protuberances 328, heels 330, and holes 332 are labelled only relative to pop-up arm 318(2) and friction arm 312(2) to avoid clutter on the drawing page). Toe contact with the protuberances 328 can force the pop-up arms 318 away from the hinge axes and cause the pop-up arms 318 to compress the springs 320 and extend farther into holes 332. The energy stored by the compressed springs 320 creates the pop-up force. The pop-up arms 318 and springs 320 can represent a pop-up assembly that provides the pop-up feature. Thus, the pop-up arms 318 and the springs 320 provide a technical solution of storing energy during device closing to facilitate automatic or assisted device opening. The pop-up feature can also allow the user to open the device with one hand rather than two hands. This assisted device opening can decrease a likelihood of the user struggling to open the device and potentially accidentally dropping the device as they are attempting to open it. Other pop-up assemblies are contemplated.

The oblong friction shafts 308 are friction fit in the oblong apertures 316 of the friction bands 314. Profiles of the outer dimensions of the friction shafts 308 and the profiles of the inner dimensions of the aperture can be selected to create more friction at specific orientations and less friction at other orientations. For instance, friction can be low at the closed orientation and progressively increase as the device is opened. The profiles can achieve this progressive friction while being wear resistant and occupying very little device real estate in the y and/or z reference directions (e.g., along the hinge axis and/or relative to device thickness). The profiles of friction shafts and the apertures can also produce high amounts of friction per unit length of friction shaft. This can allow desired friction levels to be achieved with very short friction shafts. This configuration can allow smaller hinge assemblies as measured along the hinge axes and thus bezel width can be decreased and display dimensions increased. These aspects are discussed in more detail below relative to FIGS. 4A-8E.

FIGS. 4A-8E collectively show how example hinge assemblies 106 can produce progressive resistance to rotation from a compact durable design. FIGS. 4A-4E show the hinge assembly in the zero-degree or closed orientation. FIGS. 5A-5C show an alternative hinge assembly implementation relative to FIG. 4E. FIGS. 6A-6E show the hinge assembly in the approximately 20-degree orientation. FIGS. 7A-7E show the hinge assembly in the 180-degree orientation. FIGS. 8A-8E show the hinge assembly in the 360-degree orientation.

Figure 4A:
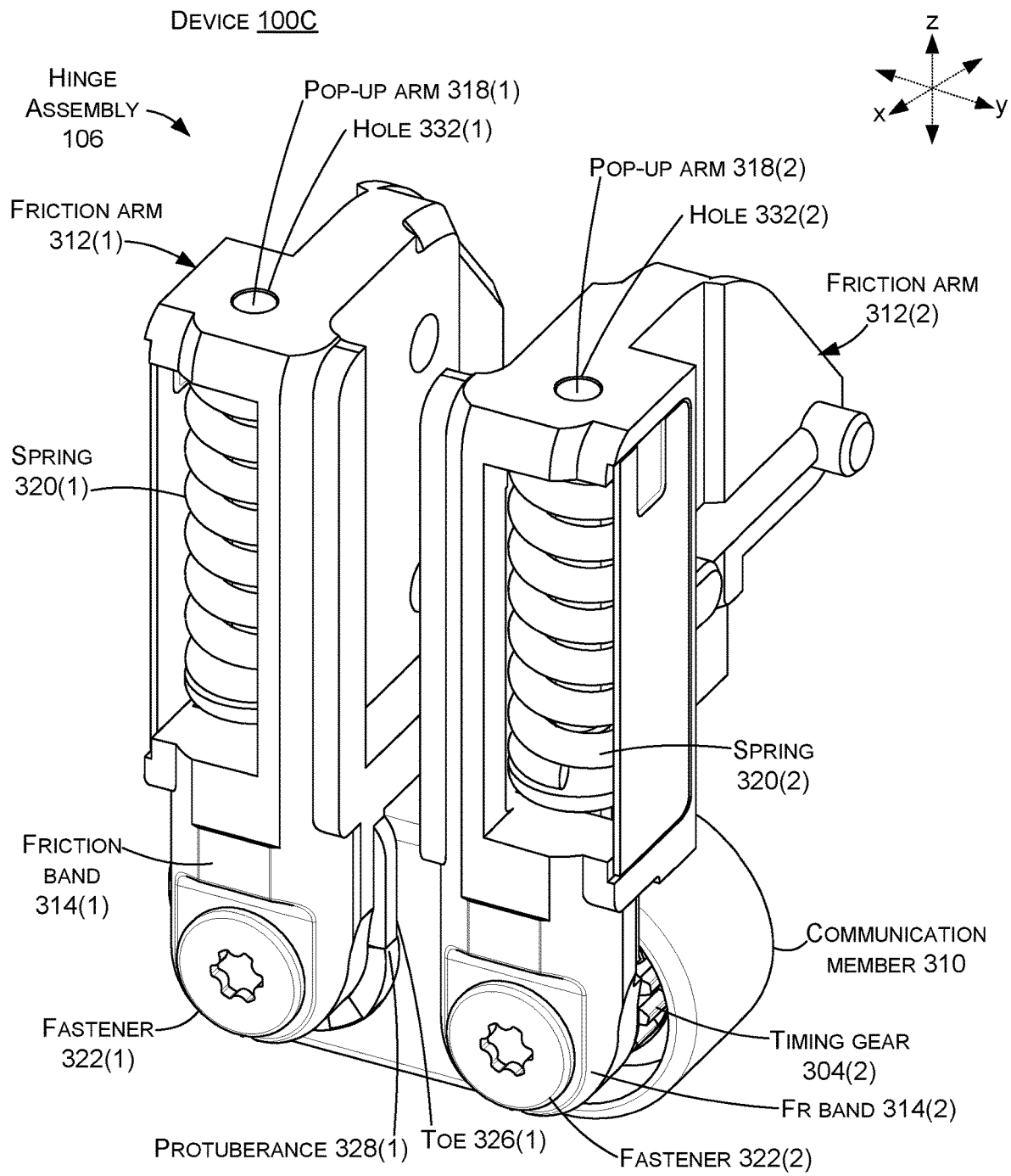
Figure 4B:
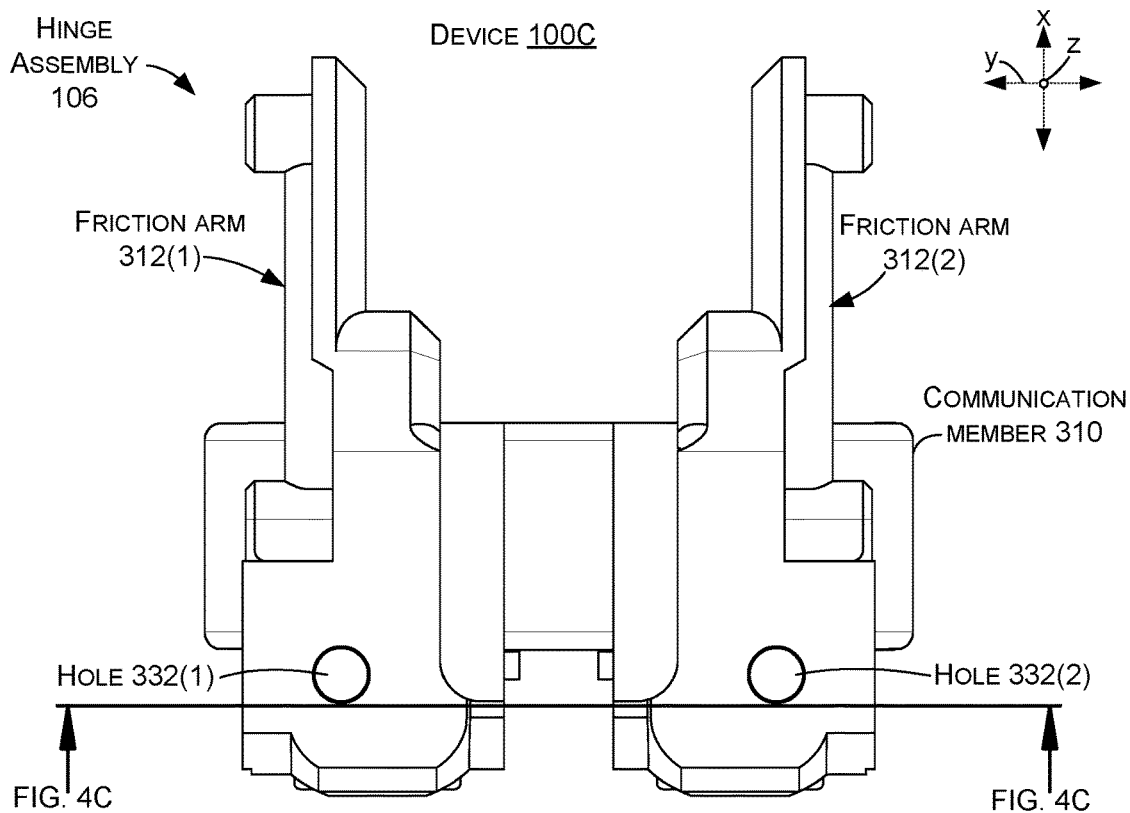
Figure 4C:
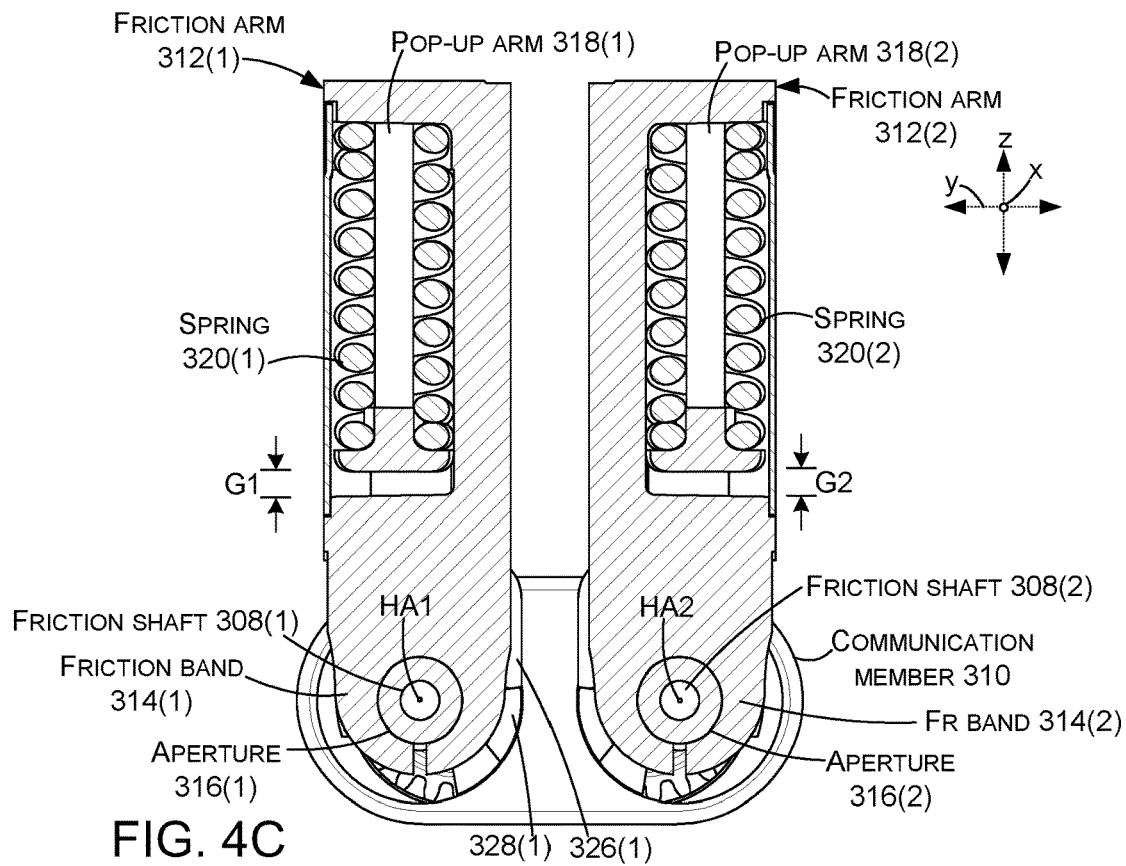
Figure 4D:
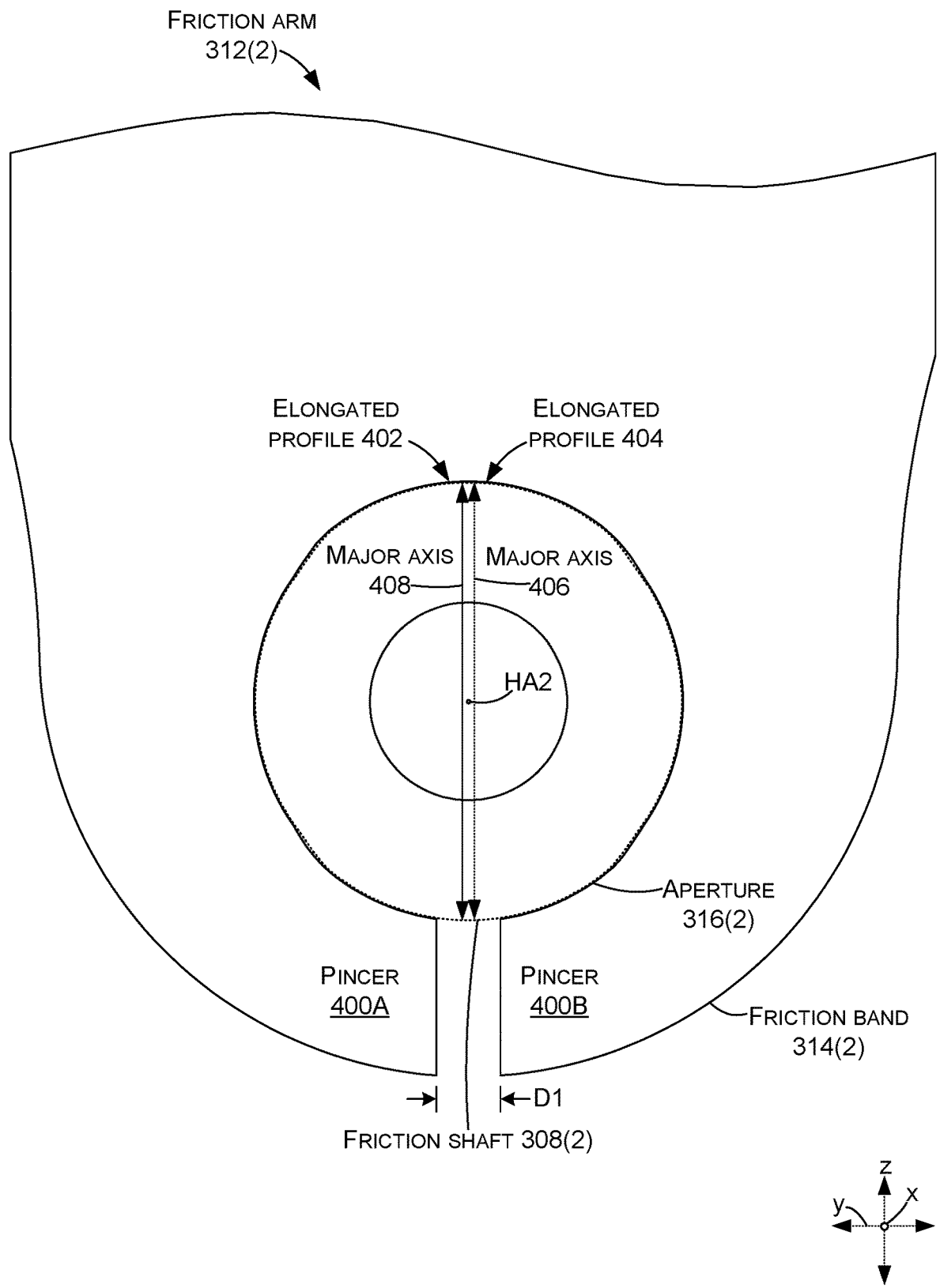
Figure 4E:
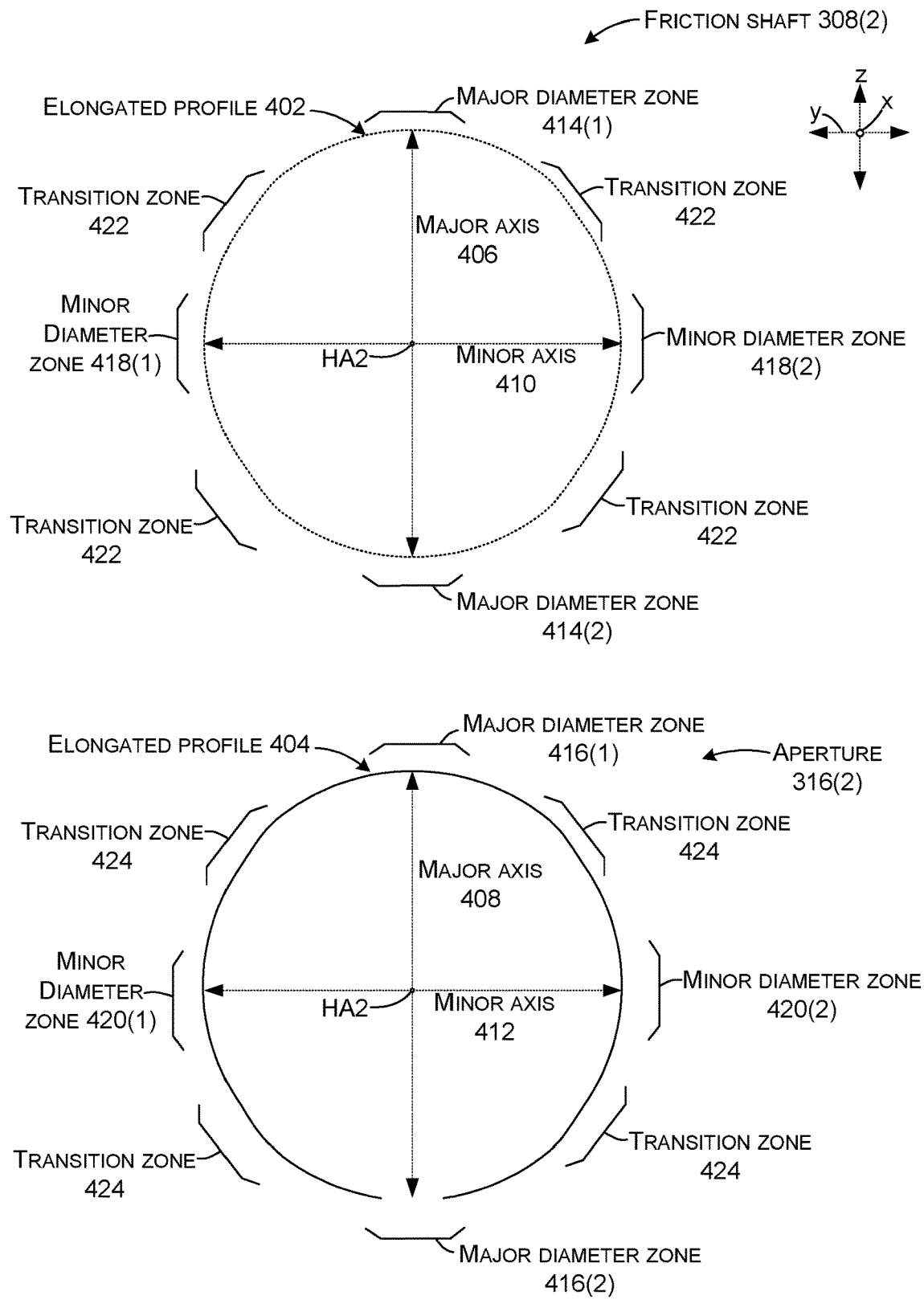

FIGS. 4A-4E show the hinge assembly at the zero-degree orientation. FIG. 4E is a similar view to FIG. 4D, where the elements are separated from one another to allow details to be more visible to the reader. As can be seen in FIGS. 4A and 4C, at this zero-degree orientation, the toes 326 of the pop-up arms 318 are contacting the protuberances 328, which forces the pop-up arms 318 away from the hinge axes and compresses the springs 320. (These elements are labelled only relative to friction arm 312(1) to avoid clutter on the drawing page). The spring compression can be evidenced by gaps (G1 and G2) between springs 320 and pop-up arms 318. The compressed springs 320 store pop-up energy to force the pop-up arms 318 to rotate away from one another (e.g., pop-up arm 318(2) in the clockwise direction and pop-up arm 318(1) in the counter-clockwise direction around the hinge axes.)

In this case, as can be seen in FIG. 4D, the friction band 314(2) can include a pair of symmetric pincers 400 (e.g., bilaterally symmetric relative to the xz reference plane). The pair of symmetric pincers 400 can collectively define the aperture 316(2) and be separated by a distance D1.

As can be seen in FIGS. 4D and 4E, the friction shafts 308 (dotted line on FIG. 4D) and the apertures 316 (solid line on FIG. 4D) can have profiles that reduce friction or resistance to rotation at this zero-degree orientation. The friction shafts 308 and the apertures 316 can have elongated profiles 402 and 404, respectively. The elongated profiles 402 and 404 can extend along major axes 406 and 408, respectively when viewed orthogonally to the hinge axes (e.g., orthogonal to the x reference axis). The major axes 406 and 408 can be perpendicularly intersected by minor axes 410 and 412, respectively. To aid the reader, the major axes 406 and 408 are shown slightly horizontally offset from one another in FIG. 4D. In at least some cases, the major axes 406 and 408 would be coincident with one another and extend through the hinge axis. When the elongated profiles 402 and 404 are parallel to one another in the zero-degree orientation they provide relatively low resistance to rotation. In devices that include a pop-up feature, the relatively low resistance to rotation can allow forces associated with the pop-up feature to have their full effect on the device. The resistance to rotation can progressively increase as the elongated profiles 402 and 404 of the friction shafts 308 and the friction bands 314 are rotated away from their parallel orientation.

In this case, as shown in FIG. 4E, the elongated profiles 402 and 404 can be oblong (e.g., generally elliptically shaped) and can entail major diameter zones 414 and 416 proximate to the major axes 406 and 408. The elongated profiles 402 and 404 can also define minor diameter zones 418 and 420. Transition zones 422 and 424 can be interposed between respective major diameter zones and minor diameter zones. Stated another way, the major diameter zones 414 and 416 and the minor diameter zones 418 and 420 can be separated by transition zones 422 and 424, respectively.

The elongated profiles 402 and 404 of the friction shafts 308 and the friction bands 314 can provide multiple wide contact zones that can resist rotation during relative rotation. Multiple contact zones can experience less wear when compared to a single point of contact in traditional designs. Further, the contact zones can entail a relatively large circumferential area relative to the hinge axis (in radians or degrees) relative to traditional designs. This relatively large circumferential design further decreases wear of the friction shafts 308 and/or the friction bands 314. Thus, the present oblong friction shafts and apertures can provide the technical solution of achieving a desired friction profile, relatively high friction (e.g., relatively high resistance to rotation) per unit length of friction shaft combined with high wear resistance over the life of the device.

The implementation described relative to FIGS. 4A-4E can provide an example orientation specific torque curve and wear resistance on short friction shafts 308 as measured along the hinge axes. However, given the subtleness of the elongate nature of the friction shafts 308 and/or the friction bands 314, these aspects may be difficult for the reader to visualize. FIGS. 5A-5C offer another implementation where features or shapes of the friction shafts 308 and/or the friction bands 314 may be more readily apparent to the reader.

FIGS. 5A-5C show another example hinge assembly 106B.

Note that this hinge assembly is similar to hinge assembly 106 described above relative to FIG. 4E. FIG. 5A shows the hinge assembly 106B in the zero-degree orientation and FIG. 5B shows the hinge assembly in the 180-degree orientation.

In the zero-degree orientation of FIG. 5A, the friction shaft 308 and the aperture 316 are aligned with their major hinge axes 406 and 408 parallel to one another. Stated another way, the elongate profiles 402 and 404 are aligned and parallel so that the major diameter zones 414 and 416 are adjacent and the minor diameters zones 418 and 420 are adjacent. At this orientation, the initial friction created when attempting to rotate the friction shaft 308 relative to the aperture 316 is relatively low. The resistance to rotation will gradually or progressively increase after an initial range of rotation of about 5 to 20 degrees, for example.

At the 180-degree orientation of FIG. 5B and FIG. 5C, the hinge assembly 106B has been rotated 180 degrees from the zero-degree orientation. (FIG. 5C is essentially the same view as FIG. 5B with additional reference content). Note that in a two hinge axis implementation, half of the rotation (e.g., 90 degrees) occurs around the visualized hinge axis and the other half occurs around the other hinge axis, which is not shown. Thus, at the 180-degree orientation, the friction shaft 308 and the aperture 316 have rotated 90 degrees relative to one another compared to the zero-degree orientation. At this orientation, the major axis 406 of the friction shaft 308 is now oriented perpendicularly (e.g., 90 degrees) to the major axis 408 of the aperture 316. The major diameter zones 414 of the friction shaft 308 are contacting the minor diameter zones 420 of the aperture 316.

This contact between the major diameter zones 414 and the minor diameter zones 420 of the aperture 316 can create a large amount of friction (e.g., resistance to rotation) between the friction shaft 308(2) and the aperture 316(2) compared with the zero-degree orientation. Further, there are multiple contact zones 502, which contribute to the friction. Further still, individual contact zones 502 are relatively large as a percentage of the circumference of the friction shaft 308(2) and the aperture 316(2) and are wear-resistant compared to traditional friction hinges that have a single relatively narrow contact point. For instance, in a traditional D-shaped friction hinge, there is a single point of contact (when viewed in two-dimensions along the hinge axis similar to the views of FIGS. 5B and 5C). This single point of contact would basically entail about one degree of contact between the friction shaft and the aperture when viewed along the hinge axis.

In comparison to these previous designs that provide one point of contact, the present implementation illustrated in FIGS. 5B and 5C includes two contact zones 502(1) and 502(2) between the friction shaft 308 and the aperture 316 when the major axis 406 of the friction shaft 308 is oriented perpendicularly to the major axis 408 of the aperture 316. Further, each of these contact zones can entail at least five degrees of contact angle (CA°) between the friction shaft 308 and the aperture 316. This configuration can provide at least 10 degrees of total contact between the friction shaft 308 and the aperture 316 (e.g., the sum of the two contact angles). Other implementations can provide at least 20 degrees or more of combined contact angle.

The illustrated implementation provides about 50 degrees of contact angle per side between the friction shaft 308 and the aperture 316 for a combined 100 degrees of contact angle. Having multiple contact zones that each provide multiple degrees of contact angle provides a technical solution to the wear problems associated with previous designs. The relatively large contact zones spread any wear over large amounts of hinge material and experience little degradation, as measured by dimensional loss, over the expected lifetime of the device (e.g., multiple thousands of opening and closing cycles). Due to the decreased surface wear, this technical solution provides relatively constant orientation specific friction profiles for the lifetime of the device compared to previous designs. For instance, some implementations can maintain at least 80% of original torque through 30,000 cycles, for example. Thus, the present solutions can provide a technical solution of more contact zones between the hinge shaft and the aperture for a given transverse cross-section of the hinge axis and more contact per contact zone (represented as degrees of contact angle) to provide a relatively higher amount of friction per unit length of the hinge shaft to provide desired progressive friction profiles while simultaneously reducing wear rates compared to previous designs.

FIGS. 6A-6E return to the example hinge assembly 106 described above relative to FIGS. 4A-4E. In this case, the hinge assembly 106 is rotated to about 20 degrees (e.g., 10 degrees around each hinge axis) relative to the zero-degree orientation illustrated relative to FIGS. 4A-4E. The rotation can be achieved, at least in part, based upon the pop-up force stored in the compressed springs 320. At this point, the pop-up force has been released and the springs 320 are no longer compressed as reflected by gaps G1 and G2 (FIG. 6C), which are now zero.

Figure 6A:
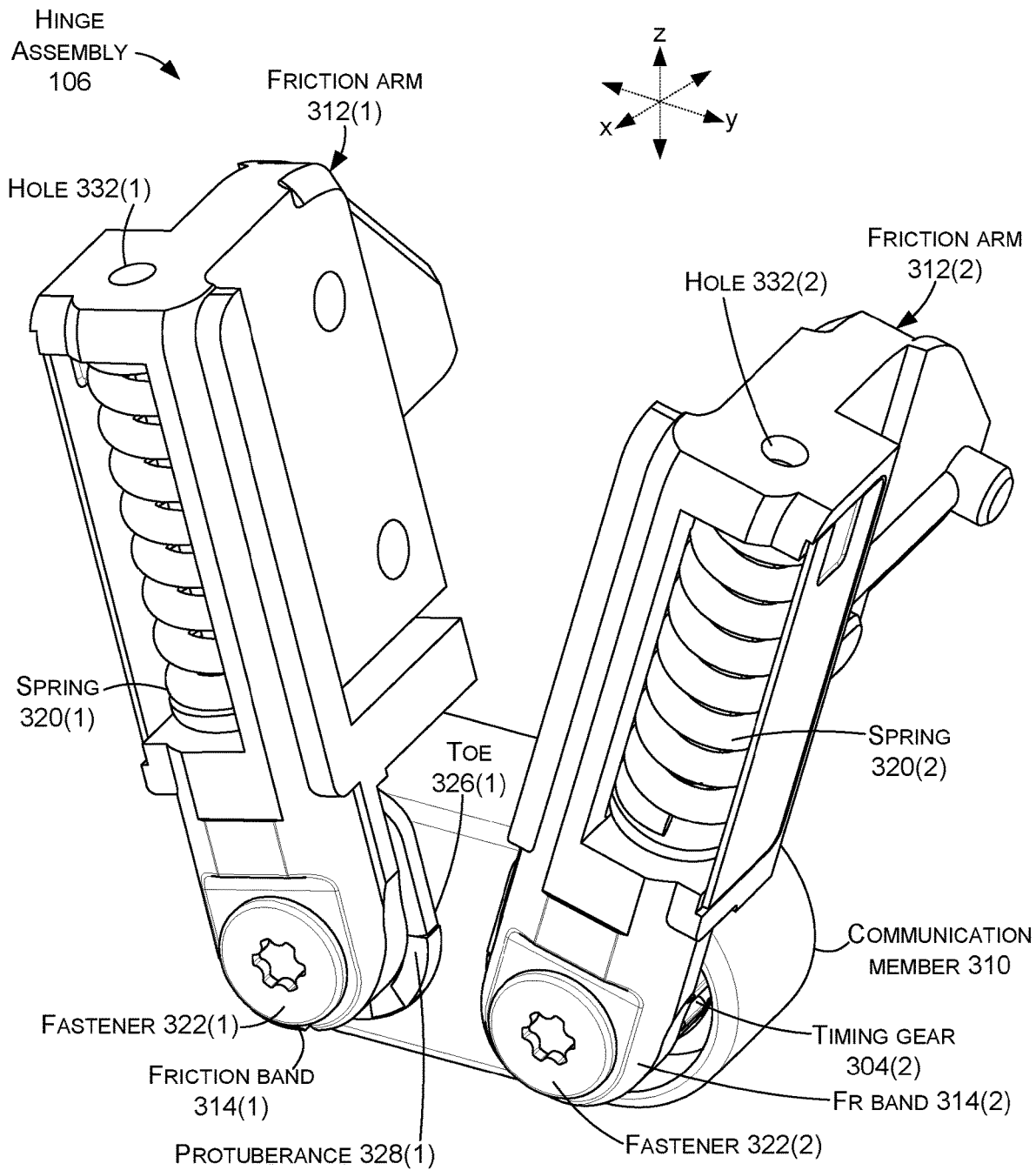
Figure 6B:
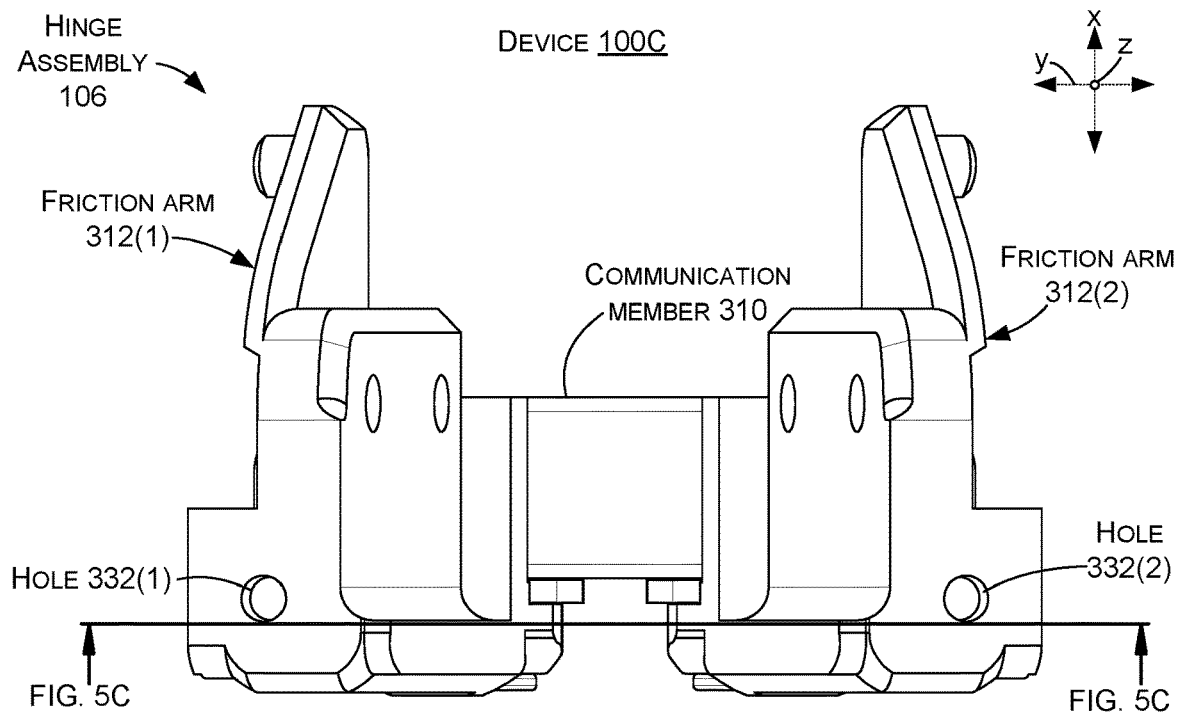
Figure 6C:
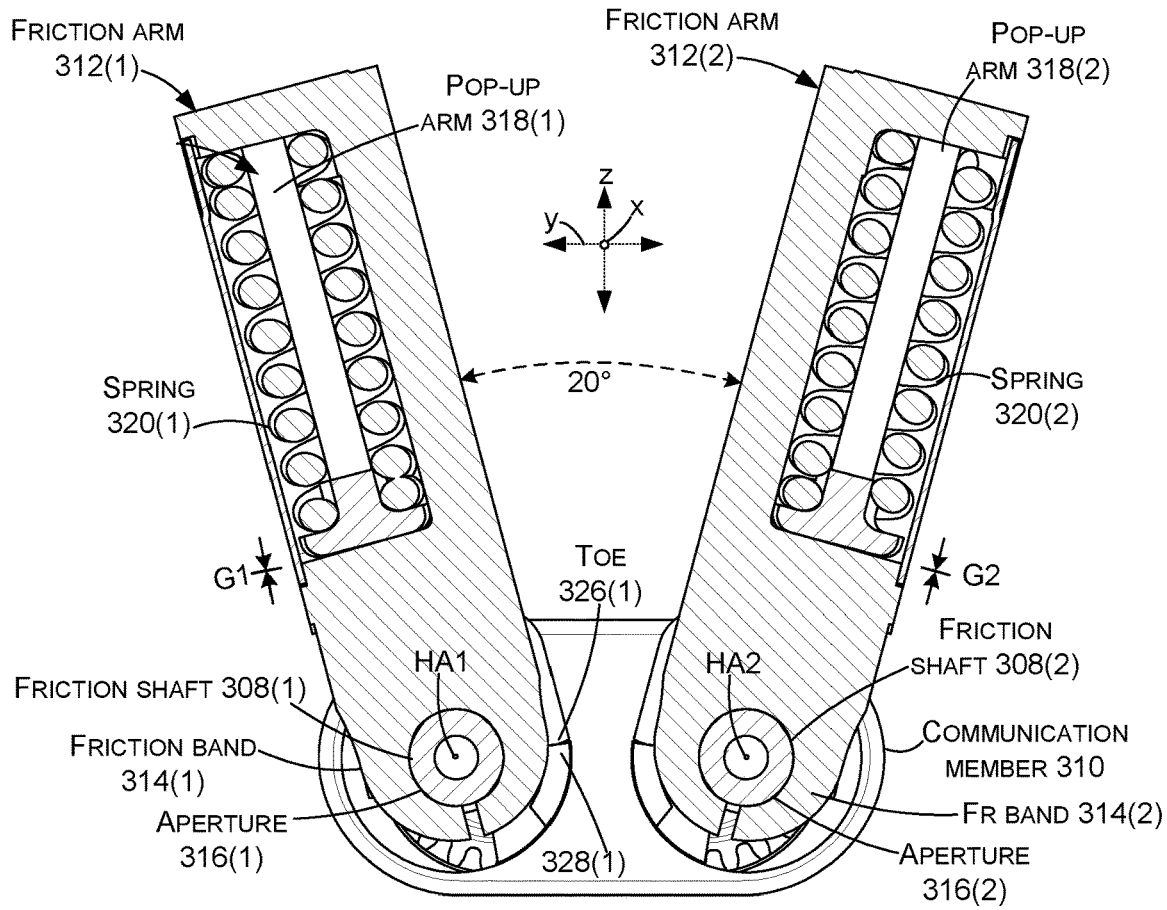
Figure 6D:
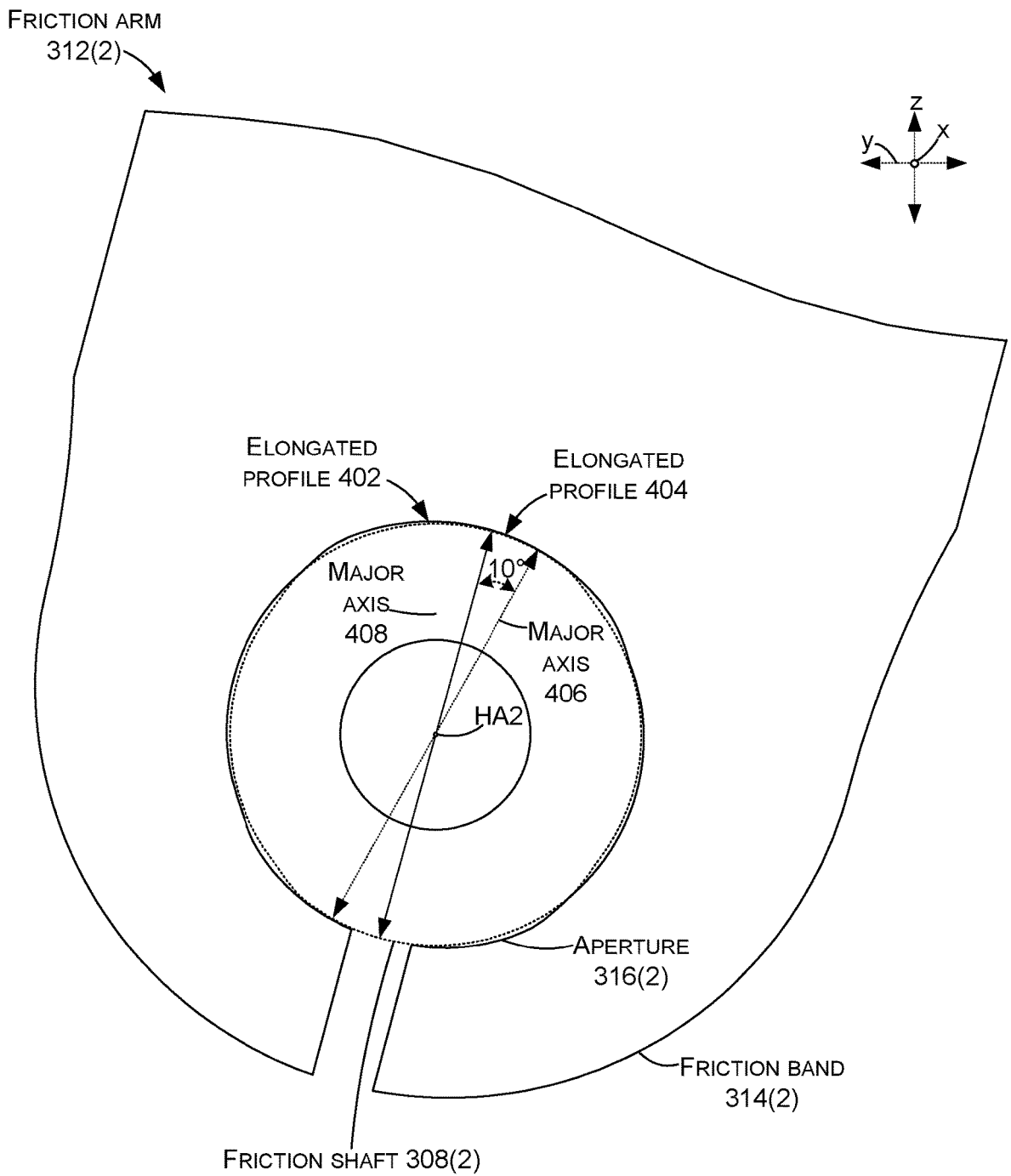
Figure 7A:
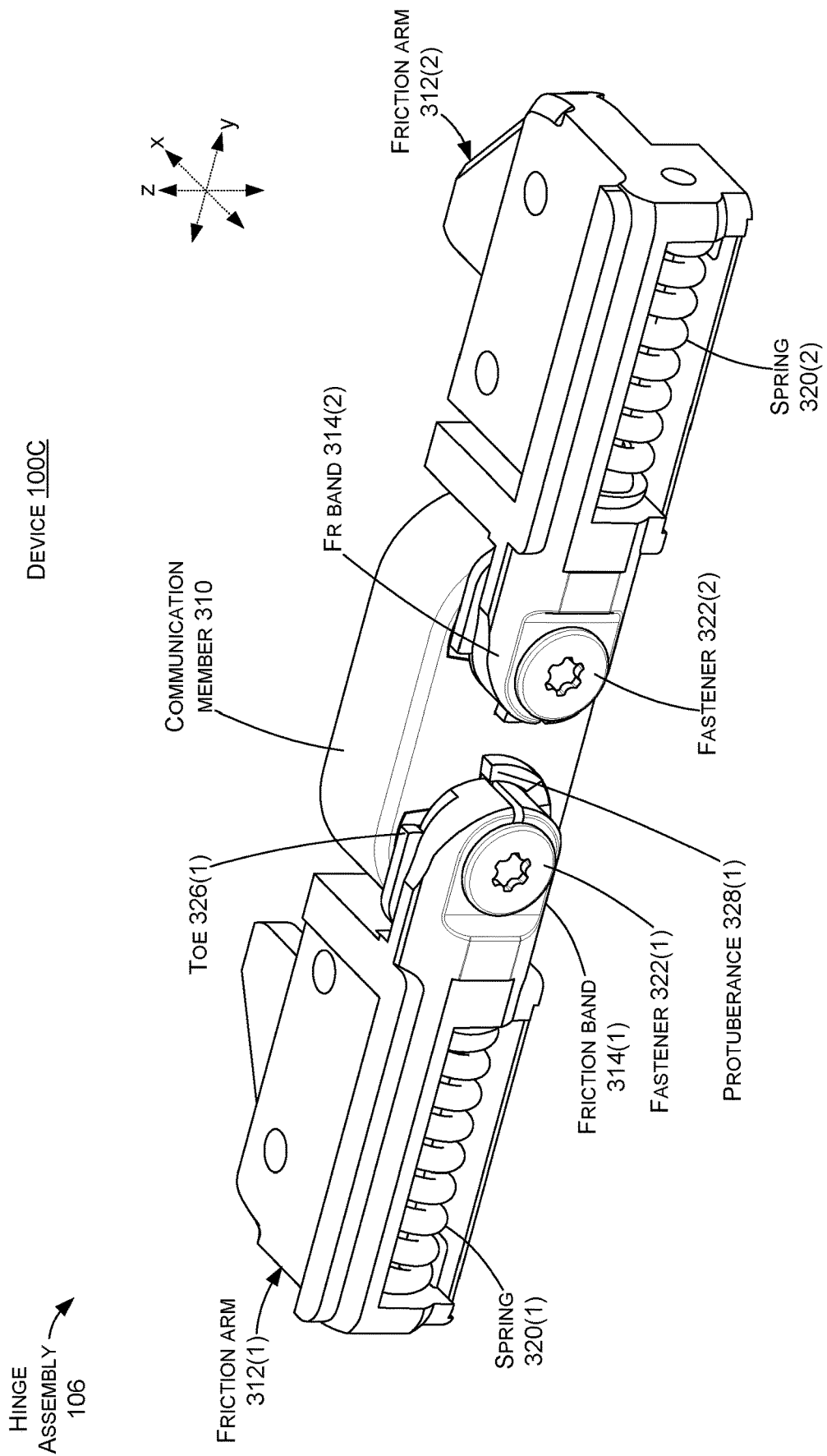
Figure 7D:
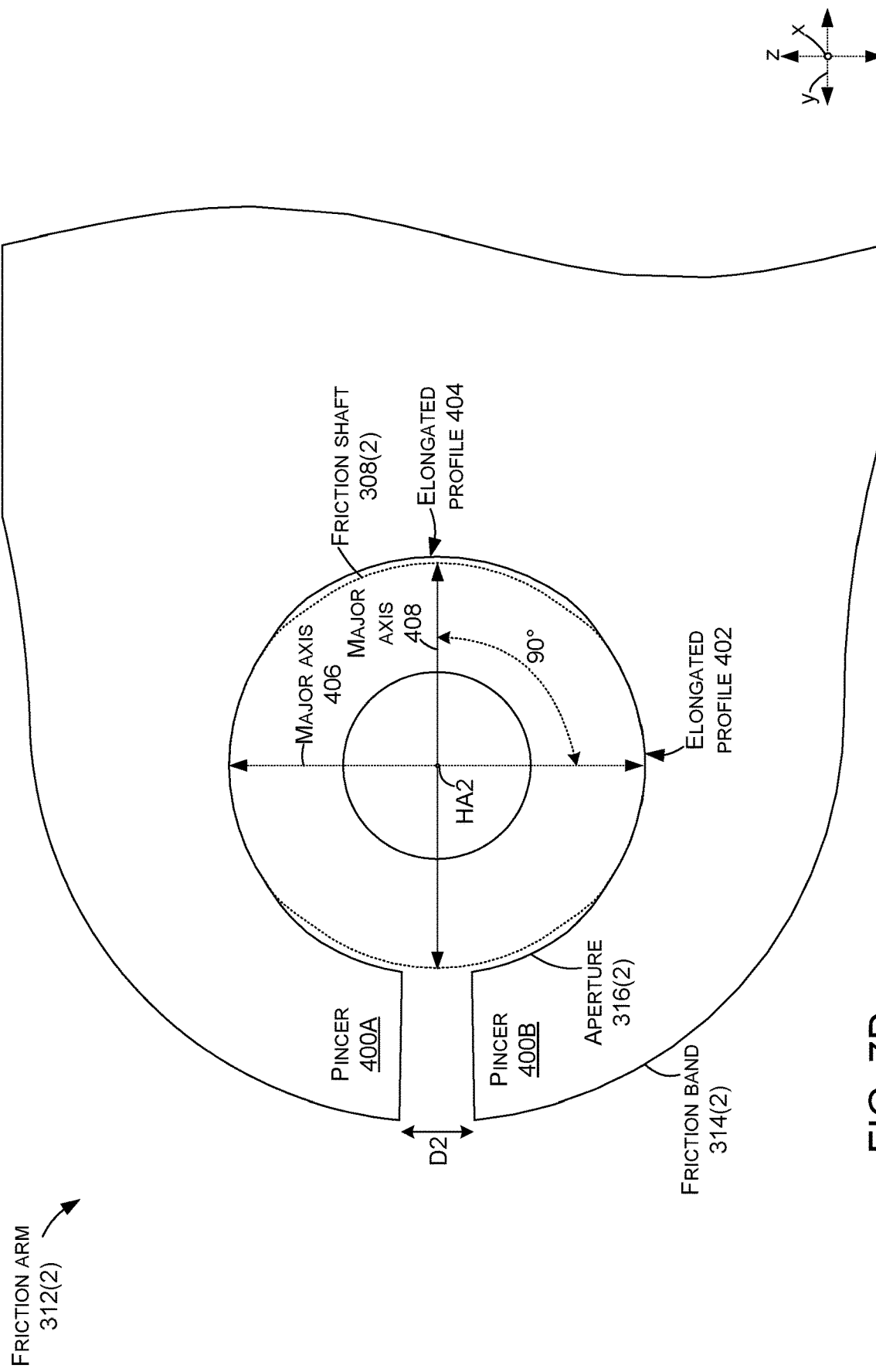
Figure 7E:
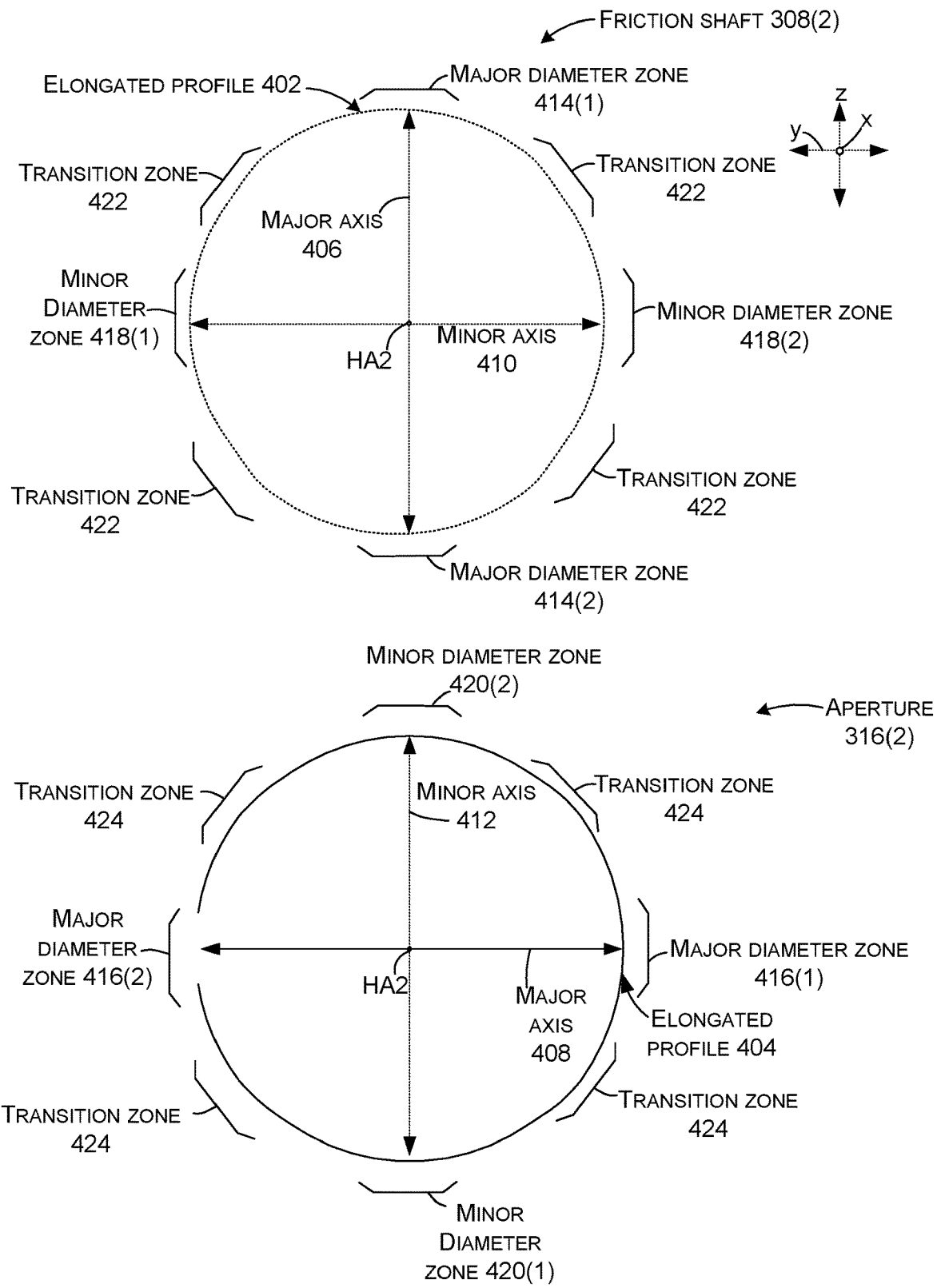
Figure 8A:
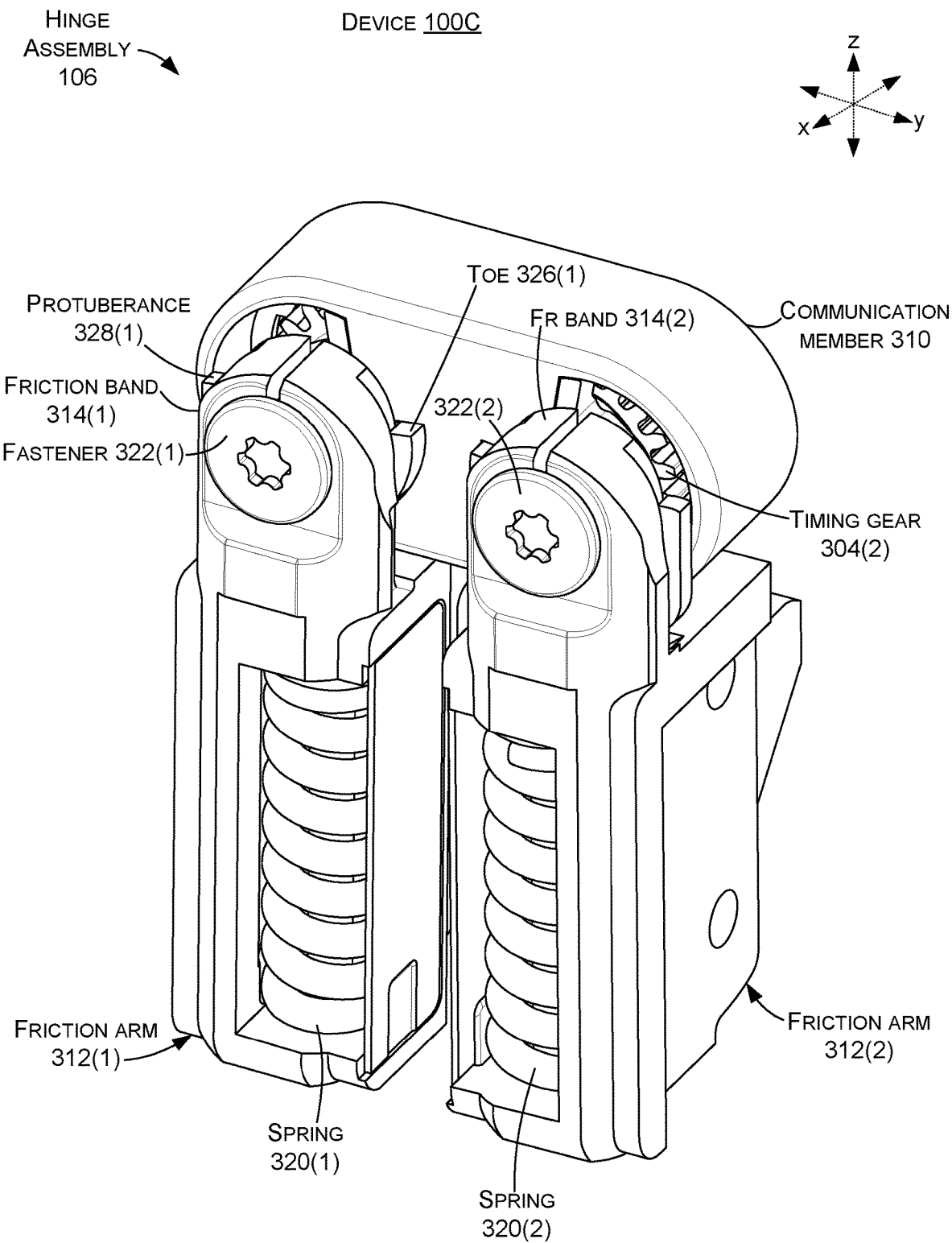
Figure 8B:
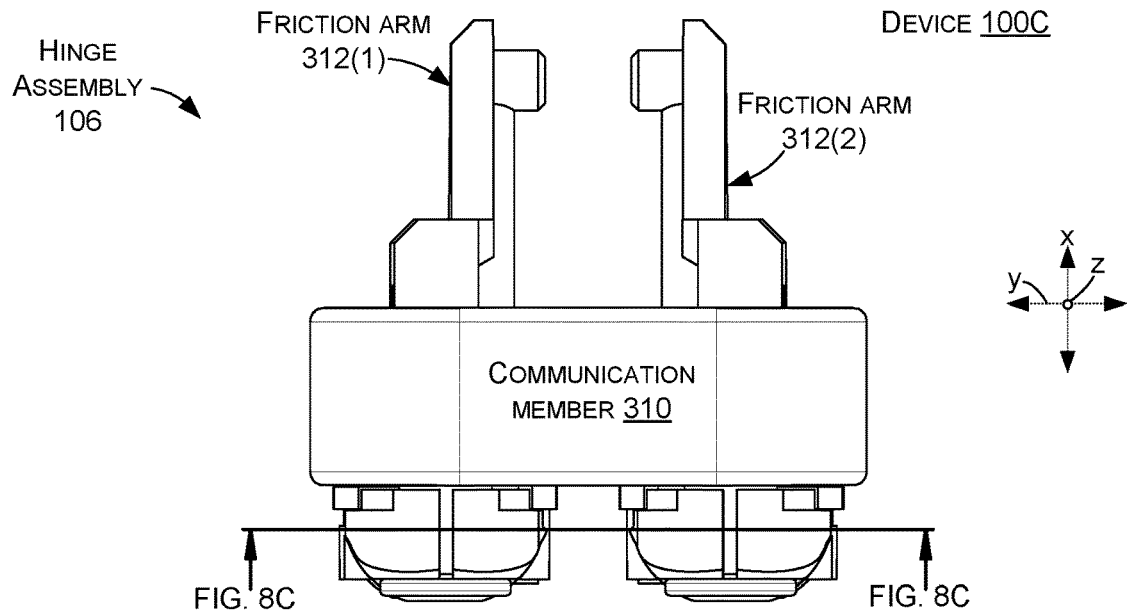
Figure 8C:
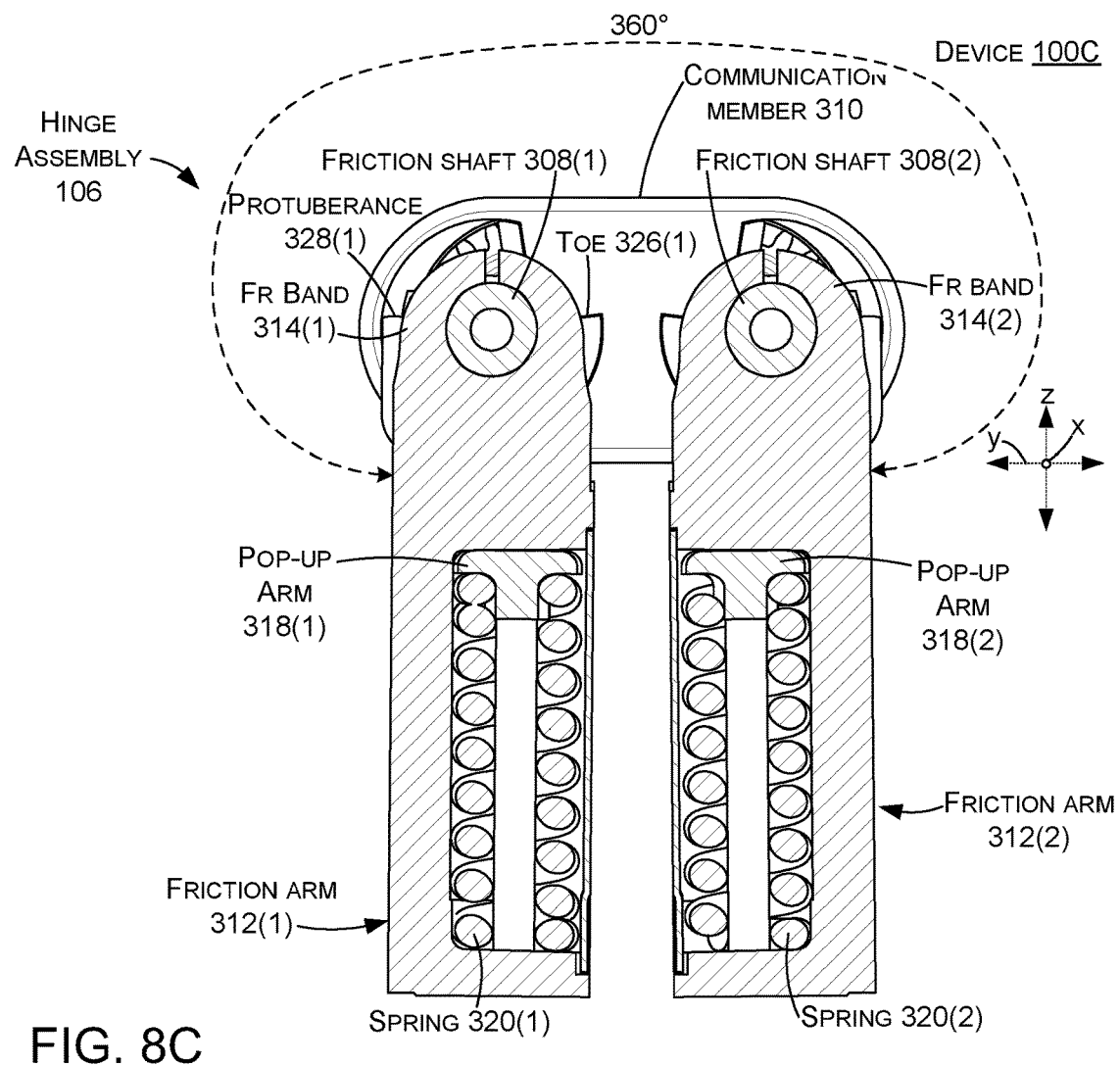
Figure 8D:
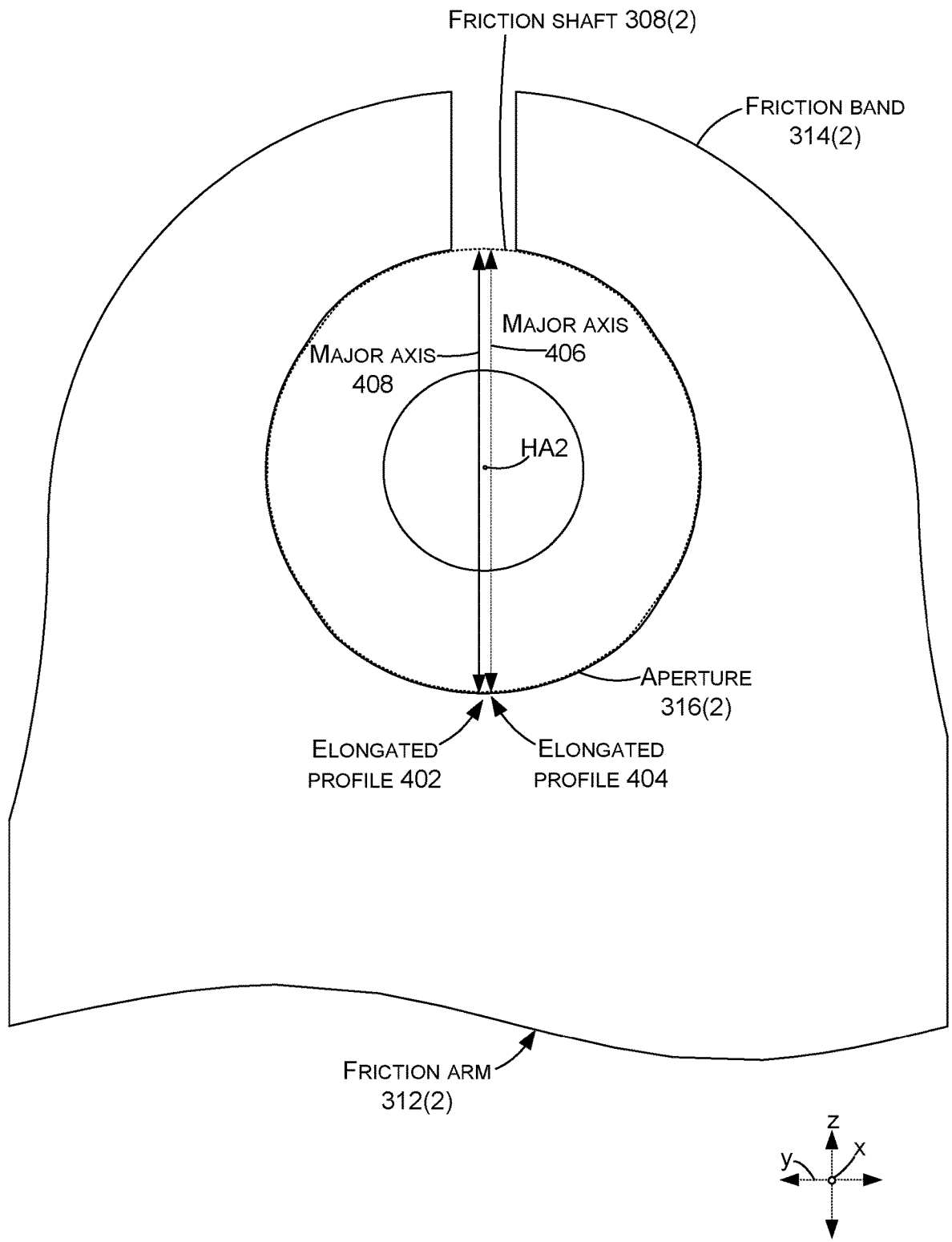

As shown in FIG. 6D, the major axes 406 and 408 are no longer parallel, but instead are in a non-parallel alignment that forms an acute 10-degree angle. As such, the contact between the friction shafts 308 and the aperture 316 begins to increase. As evidenced by viewing FIG. 6D and FIG. 6E in concert, as the hinge assembly is rotated from 0 degrees through 20 degrees, initially the transition zones 422 of the friction shafts 308 contact the transition zones 424 of the apertures 316. As the friction shafts 308 rotate within the apertures 316, the amount of interference between the two transition zone surfaces 422 and 424 progressively increases, until the major diameter zones 414 of the friction shafts contact the minor diameter zones 420 of the apertures. This increasing contact produces increasing friction and hence resistance to rotation. Further, the increasing resistance to rotation is accomplished along a relatively high circumferential percentage of the friction shafts 308 and apertures 316. This high circumferential percentage can reduce wear over the life of the device and also contribute to maintaining frictional uniformity over the life of the device when compared to traditional surfaces that experience substantial wear.

FIGS. 7A-7E continue with the example hinge assembly 106 rotated to a 180-degree orientation. At this orientation, the elongate profile 402 of the friction shafts 308 (as reflected by the major axis 406) is perpendicular to the elongate profiles 404 of the apertures 316 (as reflected by the major axis 408). The major axis 406 of the friction shafts 308 can be longer than the minor axis 412 of the apertures 316. This constriction can create large friction forces between the friction shafts 308 and the apertures 316. In some implementations, the friction shafts 308 can force pincers 400A and 400B apart as reflected by an increase in distance D2. The symmetric nature of the pincers 400 can provide a technical solution of maintaining relatively even pressure across the wide contact zones between the apertures 316 and the friction shafts 308, such as where the major diameter zones 414 of the friction shafts contact the minor diameter zones 420 of the apertures 316.

FIGS. 8A-8E show the hinge assembly 106 in a 360-degree orientation (e.g., rotated 360 degrees relative to the zero-degree orientation of FIGS. 4A-4E). In this case, the friction generated by the hinge assembly is similar to the friction generated in the zero-degree orientation. The elongated profiles 402 of the friction shafts 308 are once again aligned parallel with the elongated profiles 404 of the apertures 316, but the elongated profiles 402 and 404 are rotated 180 degrees relative to each other when compared to the zero-degree orientation. Thus, friction is relatively low because the major diameter zones 414 of the friction shafts 308 are aligned with the major diameter zones 416 of the apertures 316, the transition zones 422 are aligned with the transition zones 424, and the minor diameter zones 418 are aligned with the minor diameter zones 420.

In this implementation, the friction properties are similar at the zero-degree orientation and the 360-degree orientation. However, the pop-up forces are not the same. Unlike the zero-degree orientation, the hinge assembly 106 does not generate a pop-up force at the 360-degree orientation because the toes 326 of the pop-up arms 318 do not contact the protuberances 328 and thus, the springs 320 are not compressed to store pop-up energy. Note also, the progressive (e.g., orientation specific) resistance to rotation can be employed on hinge assemblies that do not include a pop-up feature in their design parameters. This configuration would make it easier for the user to manually open the device from the closed orientation. Similarly, the progressive resistance to rotation can be employed on hinge assemblies that include a pop-up feature at both the zero-degree orientation and the 360-degree orientation, for instance.

As discussed above, in this implementation, the friction properties are similar (e.g., symmetric) at the zero-degree orientation and the 360-degree orientation. However, other implementations can adjust the initial relative orientation of the elongate profiles 402 and 404 to provide a desired friction profile. For instance, rather than starting with the elongate profiles 402 and 404 being aligned exactly parallel at the closed orientation, the elongate profile 402 of the friction shaft could start at a negative angle value in a range from about negative one degree to about negative 20 degrees. For purposes of explanation, assume that the initial angle value of negative ten degrees was selected. Upon opening the device, the effective low friction subrange of rotation would be expanded by approximately ten degrees (e.g., from angles of zero-20 to zero-30). The mid-range friction (e.g., 30 degrees to 330 degrees) would be unchanged, and the low friction subrange at fully open would be reduced by about ten degrees (e.g., from a range of about 340-360 degrees to a range of about 350-360 degrees). This adjustment can allow the hinge assembly to satisfy design parameters for various device configurations.

The concepts explained above can provide hinge assemblies that provide a low torque at a first subrange of rotation, such as zero to 20 degrees and a high torque through a second sub-range of rotation, such as 20 degrees to 340 degrees. In some of these implementations, the torque can progressively increase from the low value at the closed orientation until a maximum torque value is achieved in the second sub-range. In some cases, this maximum torque value can be generally maintained through the second sub-range, such as from 20 degrees to 340 degrees, for example. These concepts can provide an "easy open" experience with lowered hinge torque when the device is in the 0-degree orientation (fully closed) and 360 degrees (fully open), for example.

The present concepts can also provide a "pop-up" experience to automatically open the device from the closed orientation with stored energy. The hinge assembly can include a pop-up mechanism or assembly that can be configured to store energy to open the hinge (e.g., opening force). The hinge assembly can facilitate the pop-up functionality by offering less resistance initially when opening from the closed orientation and then offering progressively higher torque at higher angle open orientations to hold the device in the desired orientation that the user sets it in. The explained concepts can achieve these aspects with a highly reliable, low wear, compact friction hinge assembly. The hinge assembly can achieve these aspects even when the axial length of the friction shaft and friction band are axially constrained (e.g., constrained along the hinge axis). For instance, in some implementations for mobile foldable dual screen devices, the friction shaft can have an axial length of approximately three millimeters, for instance. This can allow the hinge assembly to be positioned in limited real estate, such as in a bezel of five millimeters or less, for instance. The drastically short available axial length has a high impact on material wear as the hinge is cycled. As such, the present hinge design concepts can reduce/minimize material wear/torque degradation.

In some implementations, the friction bands can be C-shape defined by a pair of opposing symmetrical pincers. The friction bands can define oblong shaped apertures that receive the oblong shaped friction shafts. This configuration produces friction over large circumferential zones of the apertures and the friction shafts so that friction produced per unit axial length is high while wear of the apertures and friction shafts is low. Low wear produces more consistent friction over the life of the device when compared to high wear traditional designs that have concentrated wear areas and resultant torque degradation over the life of the device.

Thus, one aspect of the present concepts can be that pressure is distributed over a large area of the friction interface, so the present implementations can have a wide contact patch rather than a thin contact line. The internal profile of the friction band and the external profile of the friction shaft in the present implementations can feature an oblong shape (e.g., a "football" shape) that has improved progressive torque profile (initially and after use). These oblong shaped friction band apertures and friction shafts can provide the friction interface area or contact zones, which provides both relatively high torque and minimized torque degradation over time.

Individual elements of the hinge assemblies can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, and/or any combination of these materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-8E.

Various examples are described above. Additional examples are described below. One example includes a device comprising a first portion and a second portion that are rotatably secured relative to a hinge axis through a range of rotation from a closed orientation to an open orientation, a friction shaft that is secured relative to the second portion coincident with the hinge axis and that has an oblong shape when viewed orthogonally to the hinge axis, and, a friction band secured to the first portion and defining an aperture having an oblong shape when viewed orthogonally to the hinge axis and configured to receive the friction shaft, and at the closed orientation a major axis of the oblong shape of the friction shaft is aligned with a major axis of the oblong shape of the aperture to provide a relatively low resistance to rotation between the first portion and the second portion and at the open orientation the major axis of the oblong shape of the friction shaft is rotated to a non-parallel alignment relative to the major axis of the oblong shape of the aperture to provide a relatively high resistance to rotation between the first portion and the second portion.

Another example can include any of the above and/or below examples where the friction band comprises a pair of bilaterally symmetrical pincers that collectively define the aperture.

Another example can include any of the above and/or below examples where a distance between the pincers is increased when the oblong shape of the friction shaft is rotated to the non-parallel alignment relative to the major axis of the oblong shape of the aperture.

Another example can include any of the above and/or below examples where rotation of the oblong shape of the friction shaft relative to the non-parallel alignment relative to the oblong shape of the aperture is configured to create multiple contact zones on each of the oblong shape of the friction shaft and the oblong shape of the aperture.

Another example can include any of the above and/or below examples where when the non-parallel alignment comprises ninety degrees, each contact zone between the oblong shape of the friction shaft and the oblong shape of the aperture comprises at least five degrees.

Another example can include any of the above and/or below examples where when the non-parallel alignment comprises ninety degrees, each contact zone between the oblong shape of the friction shaft and the oblong shape of the aperture comprises at least twenty degrees.

Another example can include any of the above and/or below examples where displays are positioned on the first and second portions and wherein the friction shaft and the friction band are positioned in a bezel between the display and an edge of the first portion.

Another example can include any of the above and/or below examples where the bezel is less than five millimeters and wherein the friction shaft and the friction band are less than three millimeters long when measured along the hinge axis.

Another example can include any of the above and/or below examples where at the closed orientation the major axis of the oblong shape of the friction shaft is aligned parallel with the major axis of the oblong shape of the aperture or wherein at the closed orientation the major axis of the oblong shape of the friction shaft is aligned at a negative angle of one degree to 20 degrees relative to the major axis of the oblong shape of the aperture compared to a positive angle of the non-parallel alignment of the open orientation of the major axis of the oblong shape of the friction shaft relative to the major axis of the oblong shape of the aperture.

Another example can include any of the above and/or below examples where the friction shaft and the friction band comprise a first friction shaft and a first friction band that are secured between the first portion and a hinge assembly along the hinge axis that comprises a first hinge axis and further comprising a second friction shaft and a second friction band that are secured between the second portion and the hinge assembly along a second hinge axis.

Another example can include any of the above and/or below examples where a timing element is configured to synchronize rotation around the first and second hinge axes.

Another example can include any of the above and/or below examples where the timing element comprises a first gear configured to rotate around the first hinge axis and a second gear that is intermeshed with the first gear and that is configured to rotate around the second hinge axis.

Another example can include any of the above and/or below examples where a pop-up assembly is configured to store energy as the first and second portions are rotated from the open orientation to the closed orientation and to create a pop-up force with the stored energy to rotate the first and second portions toward the open orientation.

Another example can include any of the above and/or below examples where the pop-up assembly comprises a pop-up arm and a spring.

Another example can include any of the above and/or below examples where the pop-up arm is configured to compress the spring when the first and second portions are rotated toward the closed orientation.

Another example includes a device, comprising a first portion and a second portion that are rotatably secured relative to a hinge axis through a range of rotation from a closed orientation to an open orientation, an oblong friction shaft and a friction band secured to the first portion and defining an oblong aperture configured to receive the oblong friction shaft and at the closed orientation a major axis of the oblong friction shaft is aligned with a major axis of the oblong aperture to provide a relatively low resistance to rotation and at the open orientation the major axis of the oblong friction shaft is rotated relative to the major axis of the oblong aperture to provide a relatively high resistance to rotation.

Another example can include any of the above and/or below examples where the oblong aperture and the friction shaft are configured to provide relatively low resistance to rotation from the closed orientation to ten degrees of rotation and then a relatively high resistance to rotation from ten degrees to 180 degrees.

Another example can include any of the above and/or below examples where the oblong friction shaft and the friction band comprise a first oblong friction shaft and a first friction band that are secured between the first portion and a hinge assembly and further comprising a second oblong friction shaft and a second friction band that are secured between the second portion and the hinge assembly along a second hinge axis.

Another example can include any of the above and/or below examples where the hinge assembly is further configured to synchronize the rotation around the first hinge axis and the second hinge axes.

Another example can include any of the above and/or below examples where a hinge assembly is configured to store energy when the first and second portions are rotated to the closed orientation and to release the stored energy to create an opening force to rotate the first and second portions back to the open orientation.

Another example includes a device comprising a first portion that comprises a first friction band that defines a first aperture that extends along a first hinge axis, a second portion that comprises a second friction band that defines a second aperture that extends along a second hinge axis and a shaft assembly that defines first and second friction shafts, the first friction shaft received in the first aperture and the second friction shaft received in the second aperture to rotationally couple the first and second portions relative to the first and second hinge axes through a range of rotation from a closed orientation to an open orientation, the first aperture and the first friction shaft are both elongate along a major axis when viewed orthogonally to the first hinge axis and at a closed orientation the major axis of the first friction shaft is aligned with the major axis of the first aperture to produce a relatively low resistance to rotation around the first hinge axis and at an open orientation the major axis of the first friction shaft and the major axis of the first aperture are rotated and produce a relatively high resistance to rotation around the first hinge axis and at the closed orientation the major axis of the second friction shaft is aligned with the major axis of the second aperture to produce a relatively low resistance to rotation around the second hinge axis and at an open orientation the major axis of the second friction shaft and the major axis of the second aperture are rotated to produce a relatively high resistance to rotation around the second hinge axis.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising: a first portion and a second portion that are rotatably secured relative to a hinge axis through a range of rotation from a closed orientation to an open orientation; a friction shaft that is secured relative to the second portion coincident with the hinge axis and that has an oblong shape when viewed orthogonally to the hinge axis; and, a friction band secured to the first portion and defining an aperture having an oblong shape when viewed orthogonally to the hinge axis and configured to receive the friction shaft, and at the closed orientation a major axis of the oblong shape of the friction shaft is aligned within ten degrees of parallel with a major axis of the oblong shape of the aperture to provide a relatively low resistance to rotation between the first portion and the second portion and at the open orientation the major axis of the oblong shape of the friction shaft is rotated to a non-parallel alignment relative to the major axis of the oblong shape of the aperture to provide a relatively high resistance to rotation between the first portion and the second portion.

2. The device of claim 1, wherein the friction band comprises a pair of bilaterally symmetrical pincers that collectively define the aperture.

3. The device of claim 2, wherein a distance between the pincers is increased when the oblong shape of the friction shaft is rotated to the non-parallel alignment relative to the major axis of the oblong shape of the aperture.

4. The device of claim 3, wherein rotation of the oblong shape of the friction shaft relative to the non-parallel alignment relative to the oblong shape of the aperture is configured to create multiple contact zones on each of the oblong shape of the friction shaft and the oblong shape of the aperture.

5. The device of claim 4, wherein when the non-parallel alignment comprises ninety degrees, each contact zone between the oblong shape of the friction shaft and the oblong shape of the aperture comprises at least five degrees.

6. The device of claim 4, wherein when the non-parallel alignment comprises ninety degrees, each contact zone between the oblong shape of the friction shaft and the oblong shape of the aperture comprises at least twenty degrees.

7. The device of claim 1, further comprising displays positioned on the first and second portions and wherein the friction shaft and the friction band are positioned in a bezel between the display and an edge of the first portion.

8. The device of claim 7, wherein the bezel is less than five millimeters, and wherein the friction shaft and the friction band are less than three millimeters long when measured along the hinge axis.

9. The device of claim 8, wherein at the closed orientation the major axis of the oblong shape of the friction shaft is aligned parallel with the major axis of the oblong shape of the aperture.

10. The device of claim 1, wherein the friction shaft and the friction band comprise a first friction shaft and a first friction band that are secured between the first portion and a hinge assembly along the hinge axis that comprises a first hinge axis and further comprising a second friction shaft and a second friction band that are secured between the second portion and the hinge assembly along a second hinge axis.

11. The device of claim 10, further comprising a timing element configured to synchronize rotation around the first and second hinge axes.

12. The device of claim 11, wherein the timing element comprises a first gear configured to rotate around the first hinge axis and a second gear that is intermeshed with the first gear and that is configured to rotate around the second hinge axis.

13. The device of claim 1, further comprising a pop-up assembly that is configured to store energy as the first and second portions are rotated from the open orientation to the closed orientation and to create a pop-up force with the stored energy to rotate the first and second portions toward the open orientation.

14. The device of claim 13, wherein the pop-up assembly comprises a pop-up arm and a spring.

15. The device of claim 14, wherein the pop-up arm is configured to compress the spring when the first and second portions are rotated toward the closed orientation.

16. A device, comprising: a first portion and a second portion that are rotatably secured relative to a hinge axis through a range of rotation from a closed orientation to an open orientation; an oblong friction shaft; and, a friction band secured to the first portion and defining an oblong aperture configured to receive the oblong friction shaft, and at the closed orientation a major axis of the oblong friction shaft is aligned at a negative angle of one degree to 20 degrees with a major axis of the oblong aperture to provide a relatively low resistance to rotation and at the open orientation the major axis of the oblong friction shaft is rotated relative to the major axis of the oblong aperture to a positive angle of non-parallel alignment to provide a relatively high resistance to rotation.

17. The device of claim 16, wherein the oblong aperture and the oblong friction shaft are configured to provide relatively low resistance to rotation from the closed orientation to ten degrees of rotation and then a relatively high resistance to rotation from ten degrees to 180 degrees.

18. The device of claim 16, wherein the oblong friction shaft and the friction band comprise a first oblong friction shaft and a first friction band that are secured between the first portion and a hinge assembly and further comprising a second oblong friction shaft and a second friction band that are secured between the second portion and the hinge assembly along a second hinge axis.

19. The device of claim 18, wherein the hinge assembly is further configured to synchronize the rotation around the hinge axis and the second hinge axis.

20. A device, comprising: a first portion that comprises a first friction band that defines a first aperture that extends along a first hinge axis; a second portion that comprises a second friction band that defines a second aperture that extends along a second hinge axis; and, a shaft assembly that defines first and second friction shafts, the first friction shaft received in the first aperture and the second friction shaft received in the second aperture to rotationally couple the first and second portions relative to the first and second hinge axes through a range of rotations from a closed orientation to an open orientation, the first aperture and the first friction shaft are both elongate along a major axis when viewed orthogonally to the first hinge axis and at a closed orientation the major axis of the first friction shaft is aligned within 20 degrees to parallel with the major axis of the first aperture to produce a relatively low resistance to rotation around the first hinge axis and at an open orientation the major axis of the first friction shaft and the major axis of the first aperture are rotated and produce a relatively high resistance to rotation around the first hinge axis and at the closed orientation the major axis of the second friction shaft is aligned within 20 degrees to parallel with the major axis of the second aperture to produce a relatively low resistance to rotation around the second hinge axis and at the open orientation the major axis of the second friction shaft and the major axis of the second aperture are rotated and produce a relatively high resistance to rotation around the second hinge axis.

* * * * *